United States Patent [19]

Baba

[11] Patent Number: 4,858,214
[45] Date of Patent: Aug. 15, 1989

[54] TRACKING CONTROL APPARATUS

[75] Inventor: Hisatoshi Baba, Yokohama, Japan

[73] Assignee: Canon Kabushiki Kaisha, Tokyo, Japan

[21] Appl. No.: 828,872

[22] Filed: Feb. 12, 1986

[30] Foreign Application Priority Data

| Feb. 15, 1985 [JP] | Japan | 60-026450 |
|---|---|---|
| Mar. 15, 1985 [JP] | Japan | 60-051843 |
| Mar. 15, 1985 [JP] | Japan | 60-051844 |
| Apr. 19, 1985 [JP] | Japan | 60-084173 |
| Jan. 16, 1986 [JP] | Japan | 61-005055 |
| Jan. 16, 1986 [JP] | Japan | 61-005056 |

[51] Int. Cl.⁴ .................. G11B 7/085; G11B 21/08
[52] U.S. Cl. ........................................ 369/32; 369/44
[58] Field of Search ............. 369/32, 33, 41, 43-46; 358/907; 360/78, 78.04

[56] References Cited

U.S. PATENT DOCUMENTS

| 4,037,252 | 7/1977 | Janssen | 369/46 |
|---|---|---|---|
| 4,232,201 | 11/1980 | Canino | 369/44 |
| 4,330,880 | 5/1982 | Van Dijk | 369/44 |
| 4,562,562 | 12/1985 | Moriya et al. | 369/32 |
| 4,607,358 | 8/1986 | Maeda et al. | 369/44 |

Primary Examiner—Alan Faber
Assistant Examiner—Steven R. Garland
Attorney, Agent, or Firm—Fitzpatrick, Cella, Harper & Scinto

[57] ABSTRACT

An optical information recording/reproduction apparatus records or reproduces information while irradiating a track arranged on a recording medium with a light beam. The apparatus includes a photodetector for detecting a position of the light beam relative to the track, an inverter for inverting a signal from the photodetector, an actuator for deviating the light beam using the signals from the photodetector and the inverter, and a compensation controller for applying a braking force to the light beam moved by the actuator.

14 Claims, 35 Drawing Sheets

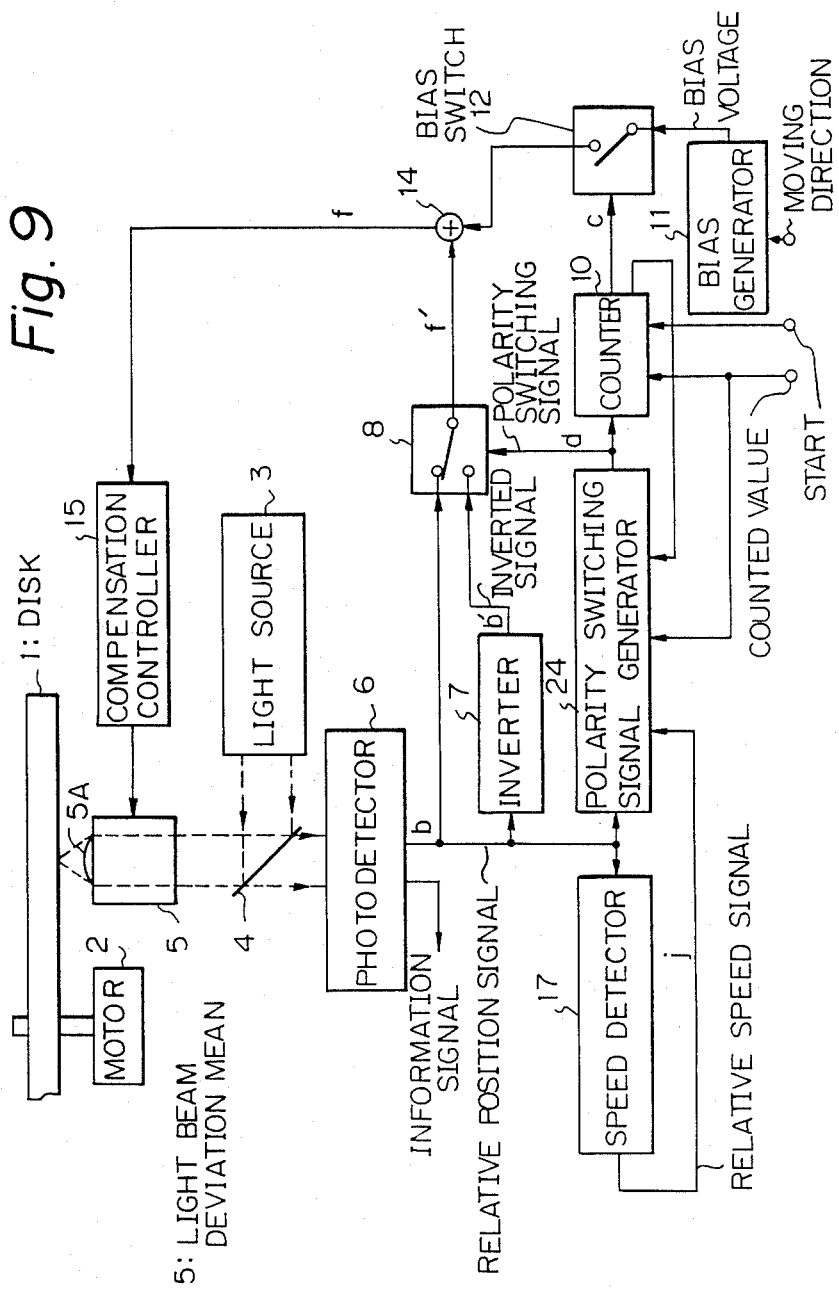

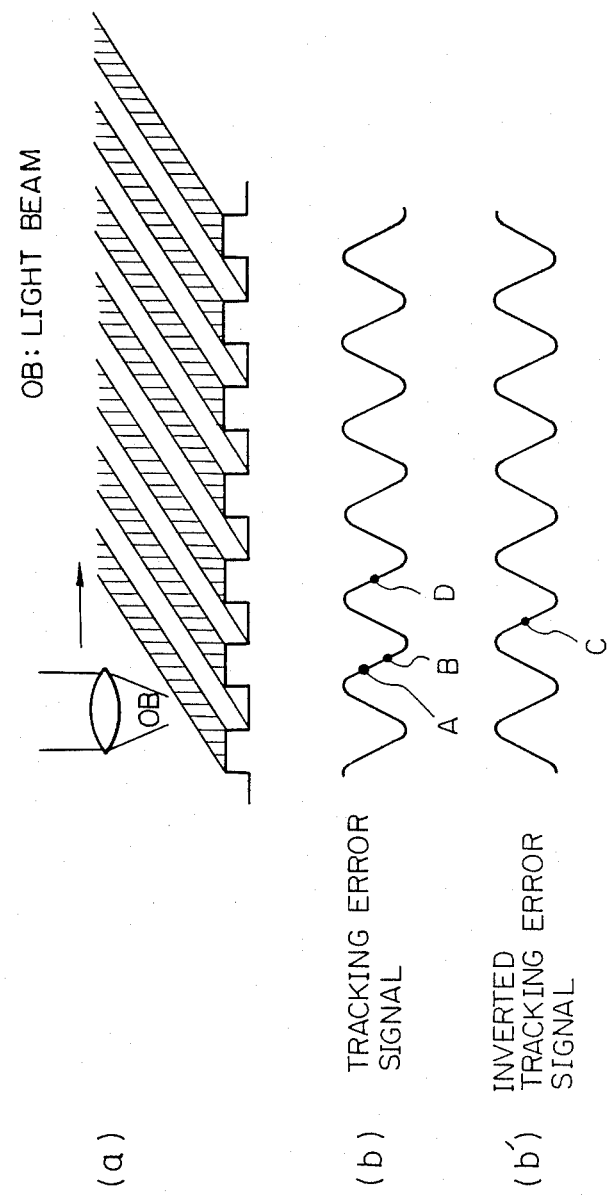

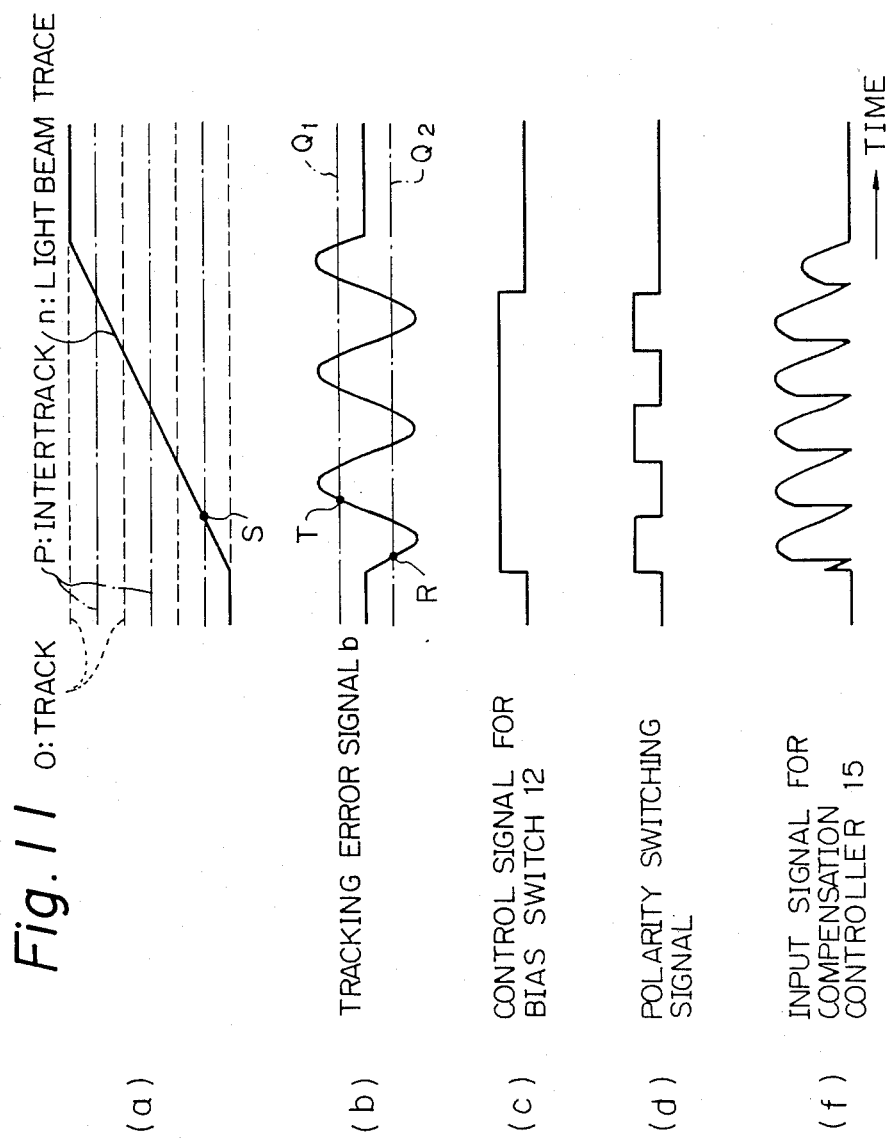

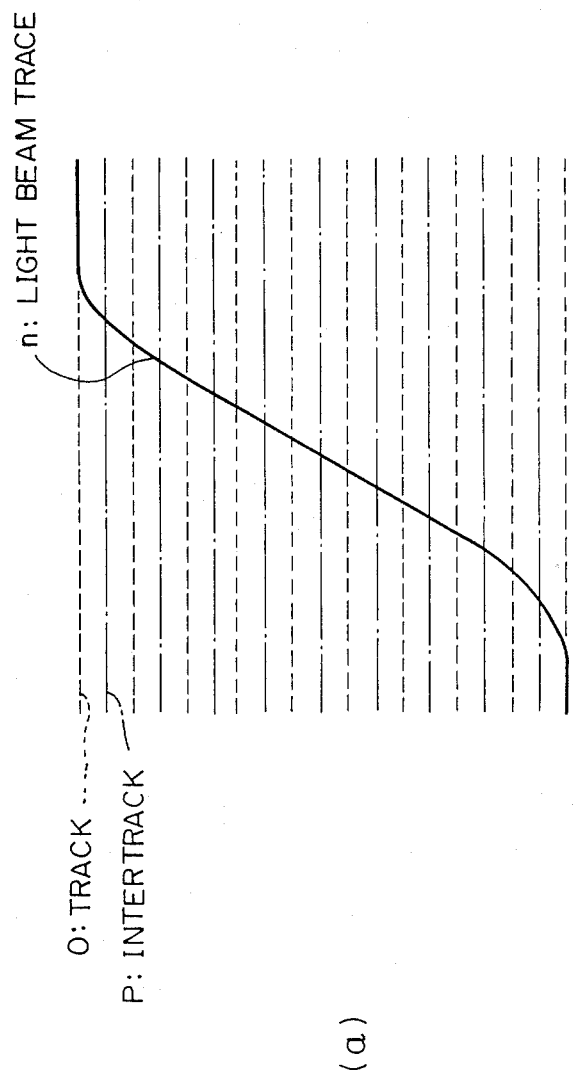

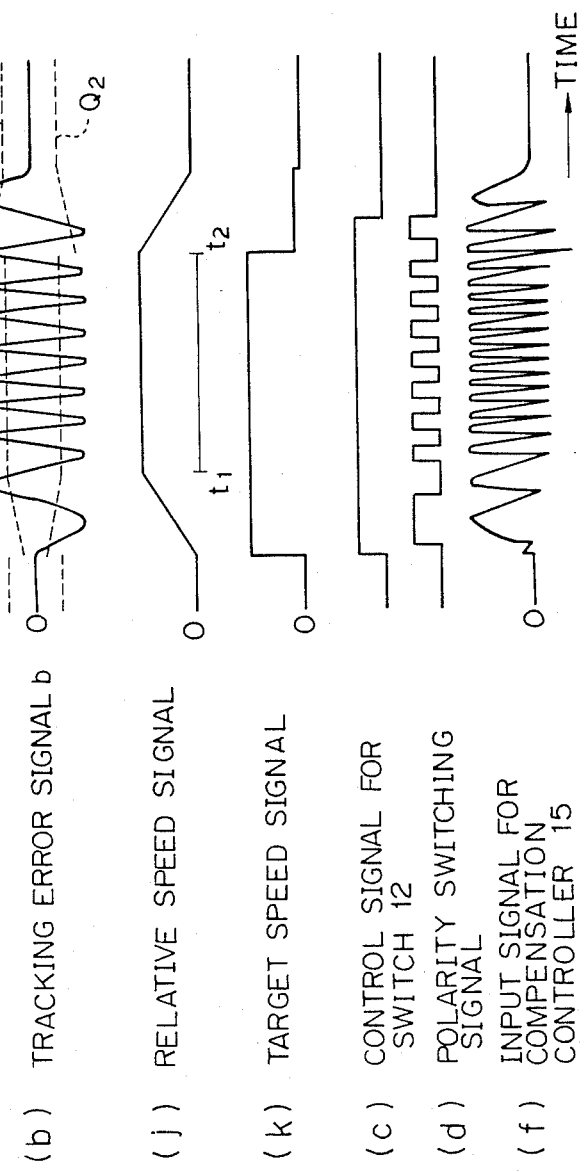

Fig. 13
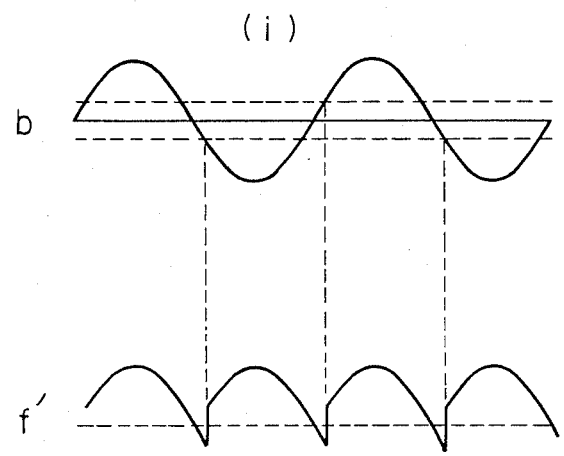
(i)
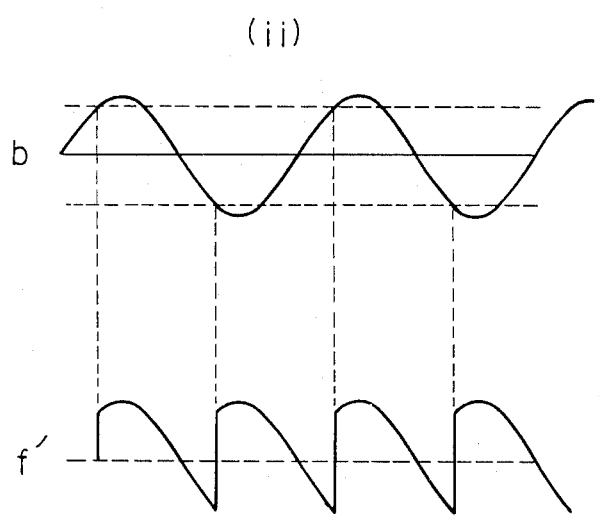
(ii)

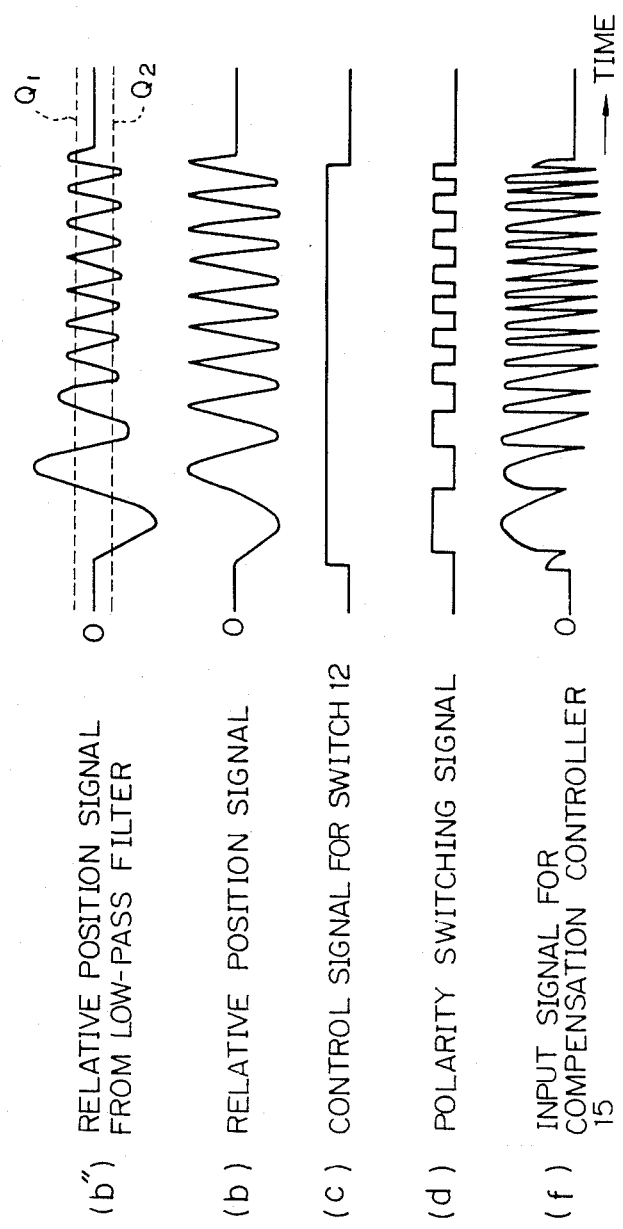

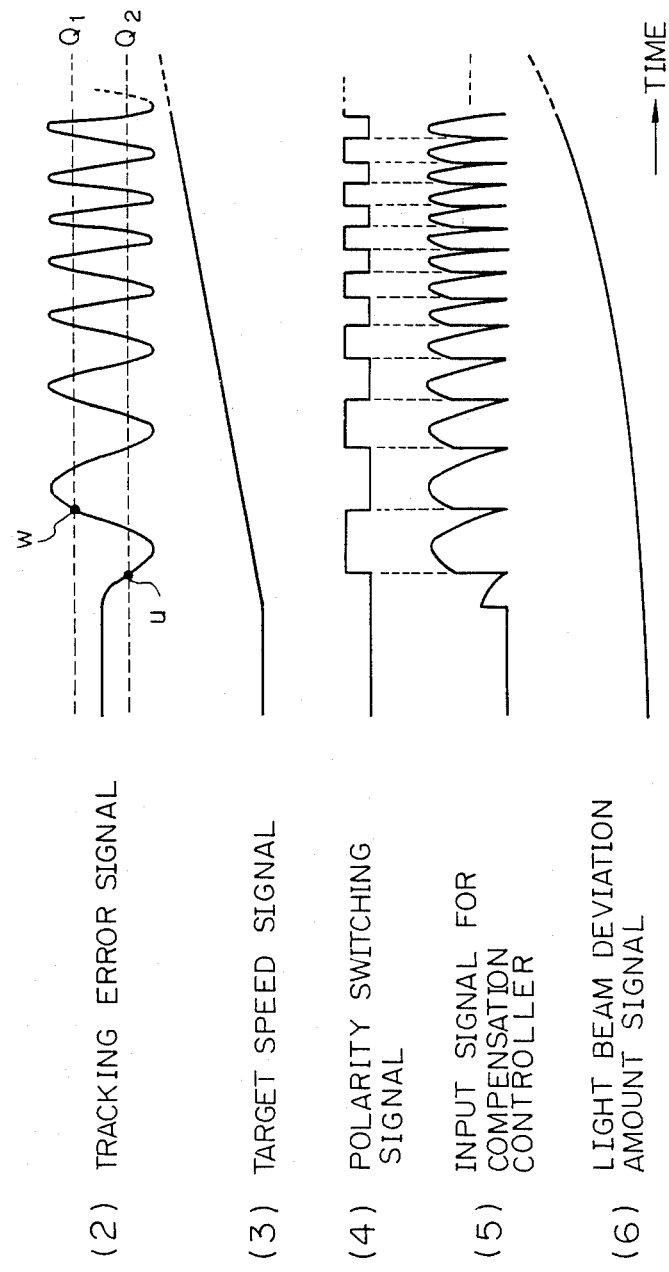

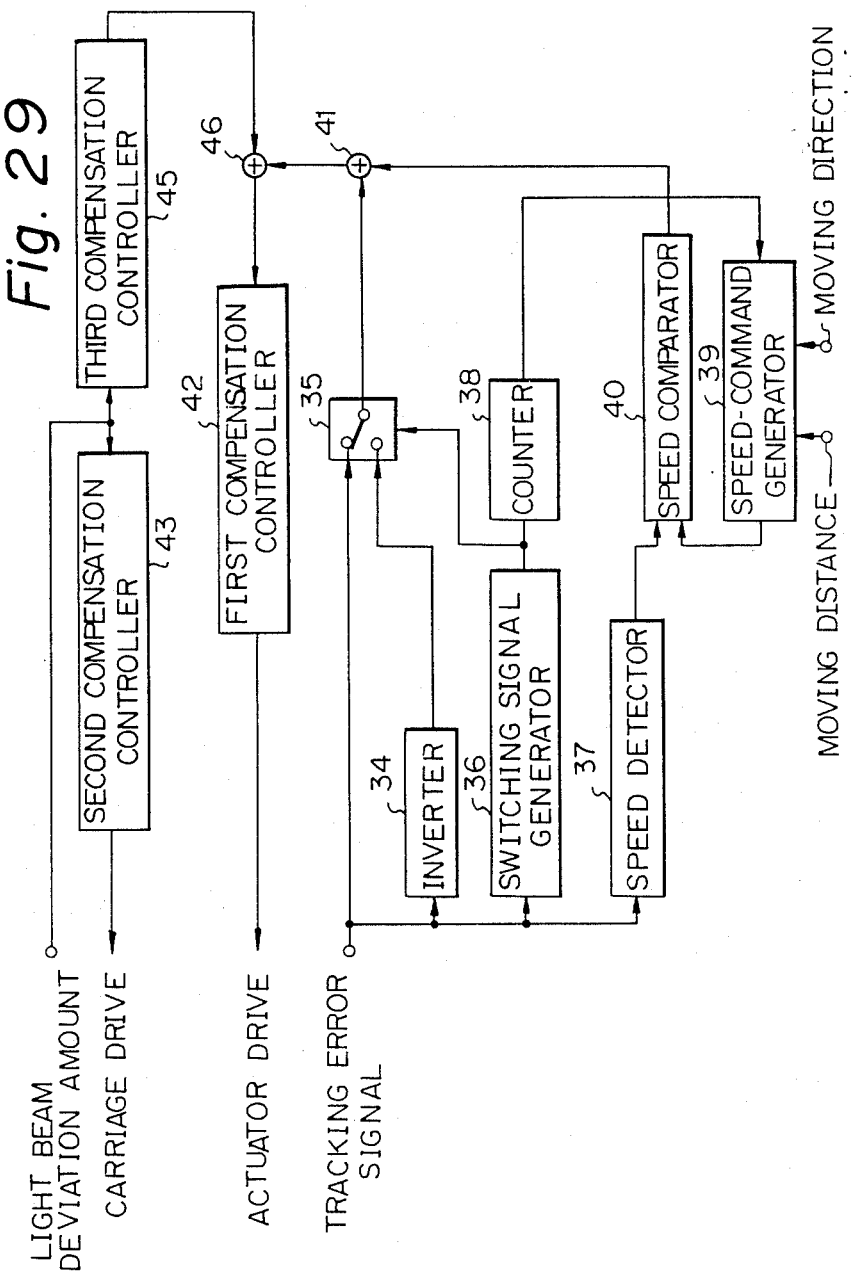

TRACKING CONTROL APPARATUS

BACKGROUND OF THE INVENTION

1. Field of the Invention

The present invention relates to a track access method of a recording medium in an apparatus which can optically record or reproduce information.

2. Description of the Prior Art

In an optical disk as an optical information recording medium, each information track is constituted by small spots as information recording units aligned in line. The information tracks are concentrically or helically arranged on the disk surface. When recorded information is read out and reproduced from the optical disk, a light beam is radiated on the information track while rotating the optical disk, and the light reflected therefrom is detected. In this case, since a light beam spot must be accurately aligned with the information track position, a tracking error of the light beam is detected from the reflected light, and control for maintaining an optical track state is performed.

In a conventional track access method in the optical disk, when control polarities are switched with reference to a tracking error signal, a light beam spot is first moved to a position between two tracks, and is then moved to an adjacent track. When the above operation is performed repeatedly, the light beam spot can be moved onto a desired track position See (SHIN-KAGUSOUZENTAI S5-4, 1984).

In the conventional track access method, however, when the light beam spot is moved across a plurality of tracks, unidirectional driving force is kept applied to a moving section for an optical head for emitting a light beam, and a moving speed of the light beam spot increases accordingly. Therefore, it is difficult to stop the light beam spot on a target track position. More specifically, in order to guide the light beam spot onto a target track position, the beam spot is stopped before the light beam spot is moved from the current track position to the next, target track position and, normal tracking control is then performed. However, if the moving speed of the light beam spot is too high, it is impossible to stop the beam spot onto the target track position only depending on tracking control gain.

SUMMARY OF THE INVENTION

It is an object of the present invention to eliminate the above drawback.

It is another object of the present invention to improve a track access method in an optical information recording/reproduction apparatus.

It is still another object of the present invention to provide a track access method which can accurately access a desired track position at high speed.

It is still another object of the present invention to provide an optical information recording/reproduction apparatus which can stably move a light beam at a desired speed.

Other objects of the present invention will be apparent from the following detailed description taken in conjunction with the accompanying drawings.

BRIEF DESCRIPTION OF DRAWINGS

FIGS. 1, 3, 4, 9, 14 to 20, and 23 are block diagrams showing arrangements of an optical information recording/reproduction according to the present invention;

FIGS. 10(a), 10(b) and 10(b') are an illustration showing the relationship between a track position and a position signal;

FIGS. 13 and 22 are output waveform charts of input and output signals of a comparator arranged in a switching signal generator;

FIG. 29 is a block diagram showing another embodiment of the present invention;

DETAILED DESCRIPTION OF THE PREFERRED EMBODIMENTS

An embodiment of the present invention will be described with reference to the accompanying drawings.

Figure 1:
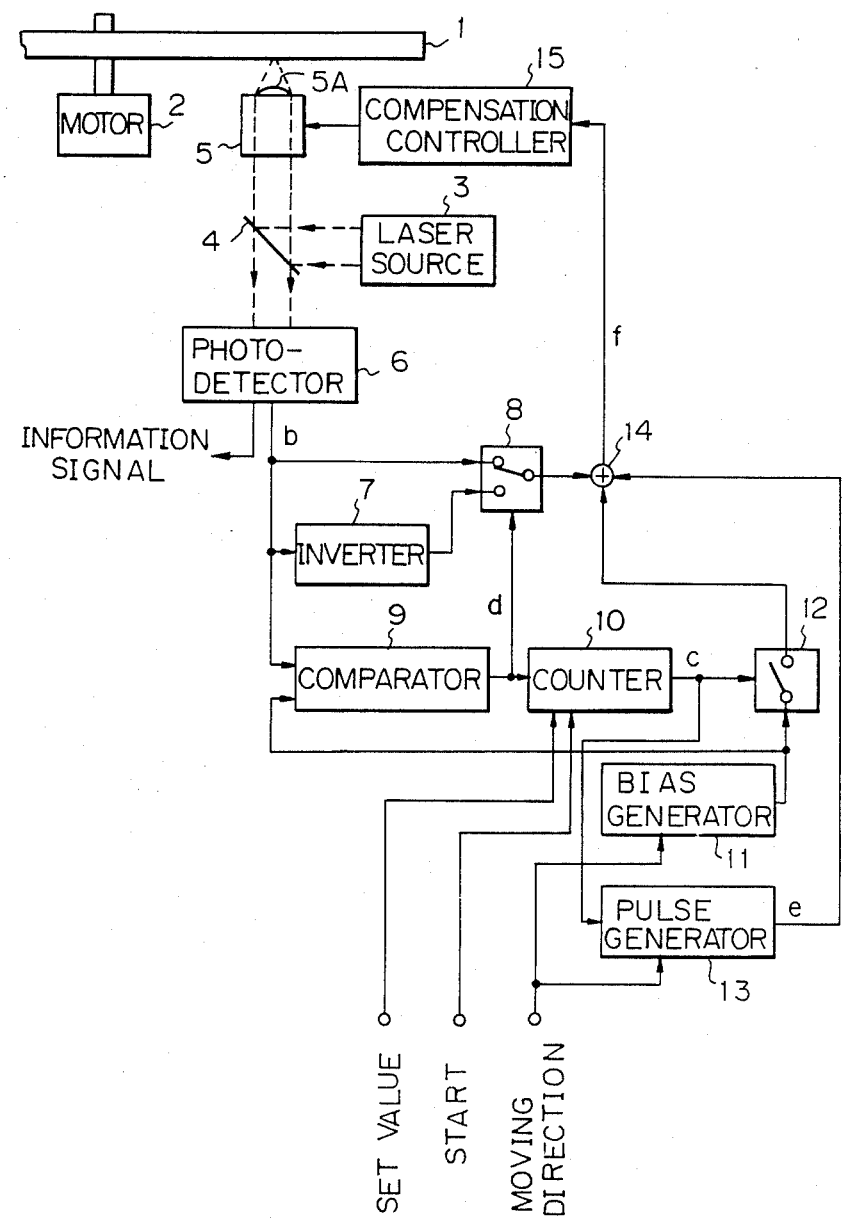

FIG. 1 is a block diagram showing a schematic arrangement of an optical information recording/reproduction apparatus based on a track access method according to an embodiment of the present invention.

Referring to FIG. 1, an optical disk (optical information recording medium) 1 is rotated by a motor 2 at, e.g., 1,800 rpm. A parallel light beam emitted from a laser source 3 is reflected by a half mirror 4 in a direction perpendicular to the optical disk 1, and is focused by an objective lens 5A of a light beam actuator 5 into a small spot having a spot size of about 1 $\mu$m on the disk 1. The light reflected from the disk 1 becomes incident on a photodetector 6 through the objective lens 5A and the half mirror 4. The photodetector 6 generates an information signal and a tracking error signal for detecting a tracking error (i.e., a position of the beam spot radiated on the disk 1 relative to an information track position). The tracking error detection is performed by a push-pull method or 3 beam method.

An inverter 7 inverts the polarity of the tracking error signal from the photodetector 6. The photodetector 6 and the inverter 7 are connected to a switch 8, which switches the output signals therefrom (i.e., switches the polarities of the tracking error signal). A bias generator 11 generates a positive or negative bias voltage based on a moving direction signal input from an external device. A comparator 9 compares the tracking error signal and the bias voltage, and generates a binary signal, which controls the switch 8. A counter 10 counts the binary signal from the comparator 9, and receives a count start signal and a count set value signal from an external device. The counter 10 generates a count signal, which controls a switch 12 arranged midway along the output line from the bias generator 11. A pulse generator 13 receives the moving direction signal from the external device, and generates pulse signals based on the moving direction signal and the output signal from the counter 10.

An adder 14 adds the outputs from the switches 8 and 12 and the pulse generator 13, and supplies the sum signal to a compensation controller 15. The compensation controller 15 deviates the light beam actuator 5 based on the sum signal from the adder 14 in a direction substantially perpendicular to the optical disk 1. The controller 15 consists of a phase compensation circuit, a drive circuit, and the like.

The light beam actuator 5 has a coil whose energization amount is controlled by the output signal from the controller 15, and a permanent magnet for generating a magnetic field at a position corresponding to the coil. The actuator 5 deviates the objective lens 5A fixed to the coil based on the electromagnetic force acting on the coil. A Galvano mirror objective lens driving type actuator or an overall optical head driving type actuator can be adopted as the light beam actuator in addition to the above arrangement.

Although not shown, the apparatus of this embodiment includes a focusing control loop so that the light beam is satisfactorily focused into a small spot on the optical disk 1 by the objective lens 5A.

The operation of the apparatus of this embodiment will now be described.

In a normal recording information reproduction mode, since the moving direction signal, the count start signal, and the count set value signal are not supplied from the external device, the switches 8 and 12 are set in the state shown in FIG. 1. In addition, since the pulse generator 13 generates no outputs, the tracking error signal from the photodetector 6 is directly input to the compensation controller 15, and the light beam actuator 5 is controlled so as to guide the light beam spot to a predetermined track position.

A track access method for moving the light beam spot in a direction to cross the tracks so as to locate it on a target track position will now be described with reference to FIG. 2. FIG. 2A illustrates a state wherein the light beam spot crosses the tracks, in which broken lines O indicate information track positions, and dotted lines P indicate intermediate positions between two tracks. FIG. 2B illustrates the tracking error signal generated from the photodetector 6, and FIG. 2C indicates the output signal, generated from the counter 10, for controlling the switch 12. FIG. 2D indicates the binary signal generated from the comparator 9, and FIG. 2E indicates the output signal from the pulse generator 13. FIG. 2F indicates the signal from the adder 14, i.e., the input signal to the compensation controller 15. Note that in FIG. 2B, $Q_1$ and $Q_2$ are positive and negative bias voltages generated from the bias generator 11, which are used as threshold values for the comparator 9.

When the count start signal, the count set value signal, and the moving direction signal are input from the external device at time $t_1$, the switch 12 is enabled based on the count start signal input to the counter 10. At the same time, the positive or negative bias voltage (i.e., $Q_1$ or $Q_2$ in FIG. 2B) is generated from the bias generator 11 in response to the moving direction signal input thereto. The bias voltage is added to the tracking error signal by the adder 14, and the sum signal is input to the compensation controller 15.

Thus, the signal for actuating the beam spot in a predetermined direction from the center of the track is input to the light beam actuator 5, and the beam spot then starts moving.

When the tracking error signal reaches the threshold value $Q_2$ at time $t_2$, the binary output signal from the comparator 9 changes, thereby switching the switch 8. Thus, the switch 8 supplies to the adder 14 the polarity inverted signal of the tracking error signal (indicated by the broken line in FIG. 2B), i.e., the output from the inverter 7.

When the tracking error signal reaches the threshold value $Q_1$ at time $t_2$, the binary output signal from the comparator 9 changes, thus switching the switch 8. Thereby, the tracking error signal is supplied from the switch 8 to the adder 14.

Switching control of the switch 8 is performed based on the binary output signal from the comparator 9 in the same manner as above. The counter 10 counts the number of one level occurring in the binary output signal from the comparator 9 (corresponding to the number of tracks the light beam spot crossed). When the count of the counter 10 reaches the count set value, the switch 12 is opened (time $t_m$) At the same time, the pulse generator 13 generates positive or negative pulses in accordance with the moving direction signal in synchronism with the trailing edge of the control signal for the switch 12. In FIG. 2, the positive input is kept supplied to the compensation controller 15 from time $t_1$ to $t_m$, and a negative pulse signal is generated from the pulse generator 13 at time $t_m$. Therefore, during the negative pulse interval from time $t_m$ to $t_n$, the input signal to the controller 15 corresponds to the sum of the tracking error signal and the pulse signal from the generator 11, and becomes a steep negative signal, as shown in FIG. 2F.

Thus, an immediate brake signal is supplied to the light beam actuator 5 during the interval from time $t_m$ to $t_n$, and the speed of the light beam spot decreases. Therefore, after time $t_n$ at which the negative pulse signal from the generator 13 disappears, the light beam spot can be accurately guided to a target track position by normal tracking control.

In the above embodiment, a width and a height of the pulse signal generated from the pulse generator 13 can be appropriately determined in accordance with moving characteristics of the light beam actuator 5.

Braking force of the light beam actuator 5 can be adjusted by not changing the width or height of the pulse signal but by changing the gain of the compensation controller 15 and/or the actuator 5 upon generation of the pulse signal.

Figure 3:
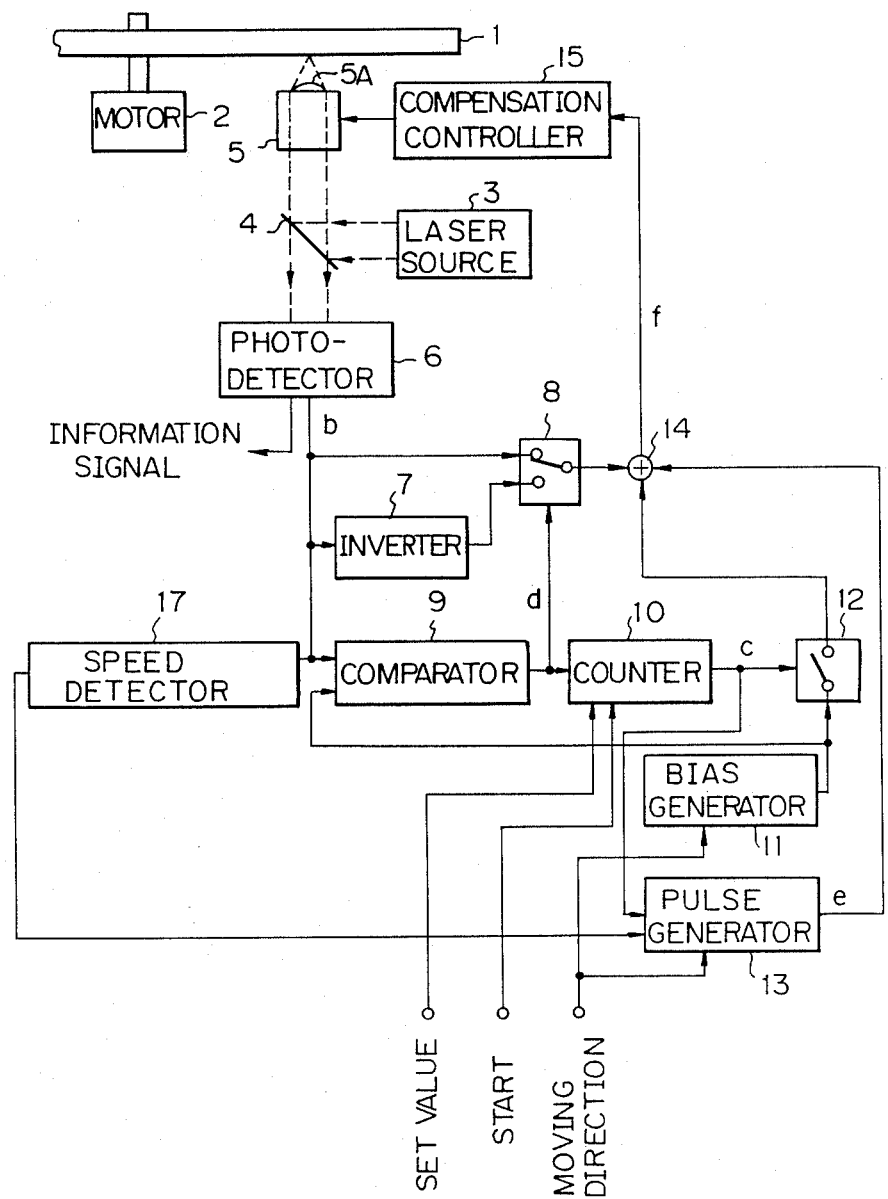

FIG. 3 is a block diagram showing a schematic arrangement of an optical information reproduction apparatus using the track access method according to another embodiment of the present invention. The same reference numerals in FIG. 3 denotes the same parts as in FIG. 1, and a detailed description thereof will be omitted.

In this embodiment, a speed of a light beam spot relative to an information track position is detected by a speed detector 17 based on a tracking error signal. The detection output from the detector 17 is supplied to a pulse generator 13 so that pulse width or height generated from the generator 13 is changed in accordance with the relative speed near the target track position. When the speed is high, the pulse width or height is increased; otherwise, it is decreased, thus obtaining an optical brake signal.

The speed detector 17 can comprise an F-V (Frequency-Voltage) converter, but can be various other means.

Figure 4:
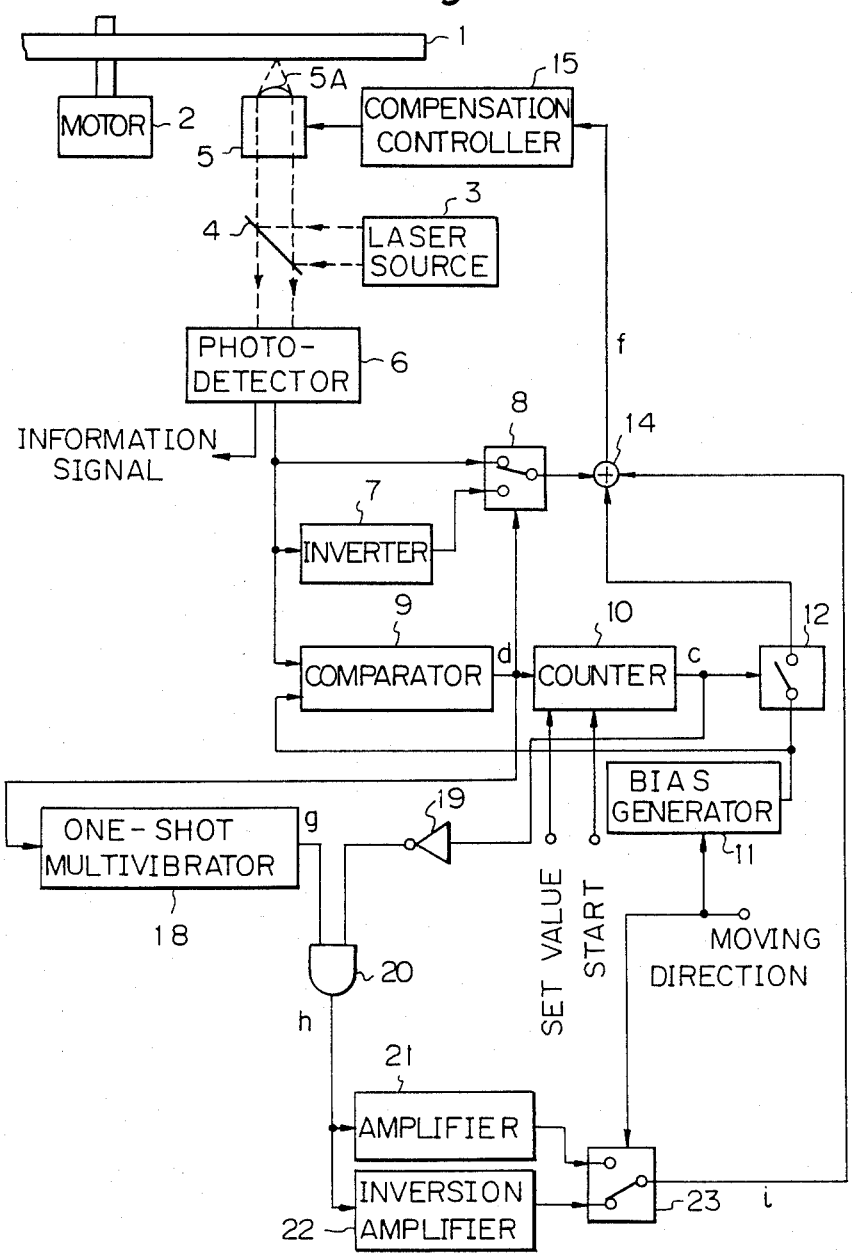
Figure 5:
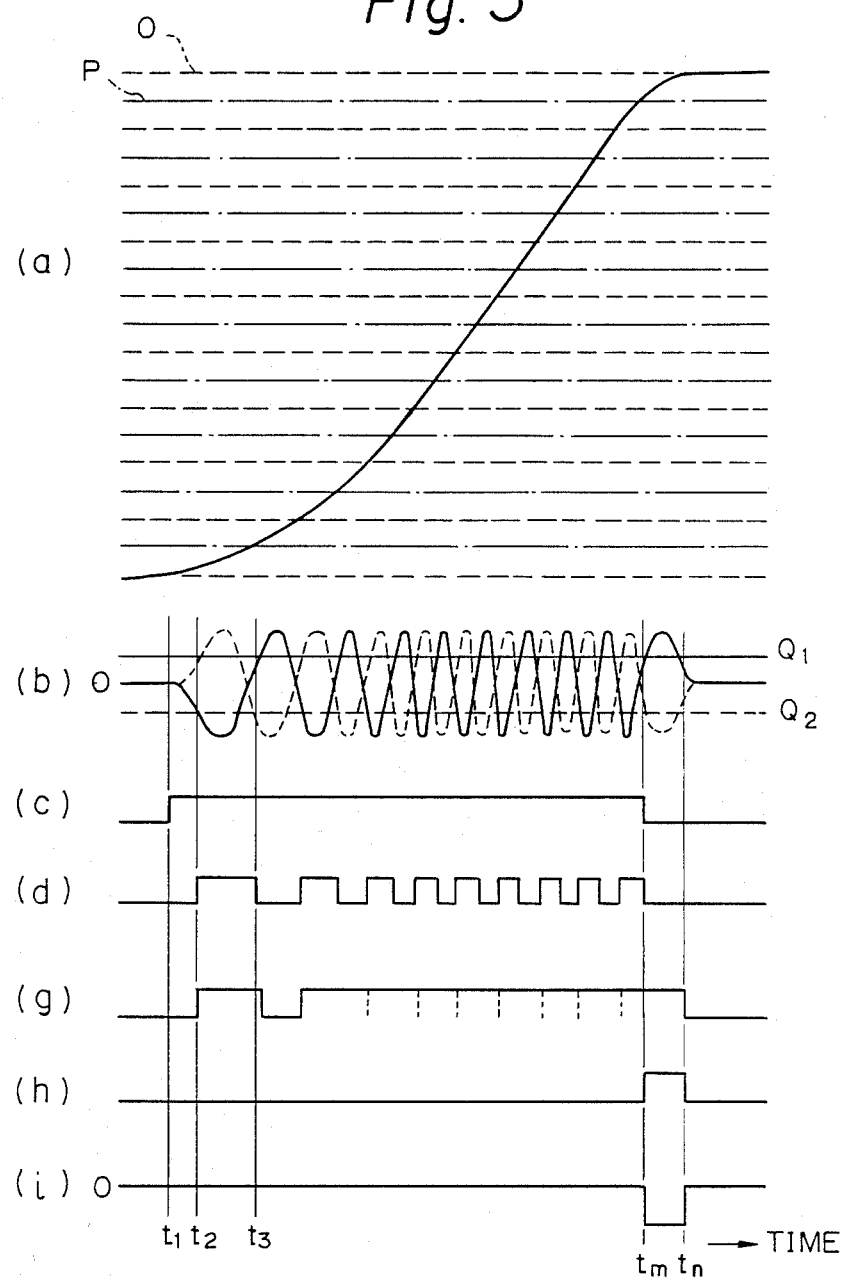

FIG. 4 is a block diagram of an optical information recording/reproduction apparatus using the track access method according to another embodiment of the present invention. The same reference numerals in FIG. 4 denote the same parts as in FIG. 1, and a detailed description thereof will be omitted.

In this embodiment, the output from a comparator 9 is supplied to a re-triggerable one-shot multivibrator 18, and the output from a counter 10 is inverted by an inverter 19. The outputs from the one-shot multivibrator 18 and the inverter 19 are supplied to an AND gate 20, and the AND product therefrom is amplified by an amplifier 21, and an inversion amplifier 22. A switch 23 selectively connects the outputs from the amplifiers 21 and 22 to an adder 14. The switch 23 is controlled by a moving direction signal from an external device.

The operation of this embodiment will now be described.

The operation in the normal recording information reproduction mode is the same as in the embodiment shown in FIG. 1.

FIGS. 5A, 5B, 5C, and 5D show signal timings like that in FIGS. 2A, 2B, 2C, and 2D. FIG. 5G indicates the output signal from the one-shot multivibrator 18, FIG. 5H indicates the output signal from the AND gate 20, and FIG. 5I indicates the signal supplied to the adder 14 from the switch 23.

The multivibrator 18 is triggered in response to the leading edge of the output signal from the comparator 9 at time $t_2$, and thereafter, is similarly triggered in response thereto, thus producing a pulse signal having a given pulse width.

At time $t_m$, a pulse signal having a width corresponding to an interval from time $t_m$ to $t_n$ is generated from the AND gate 20. Time $t_n$ coincides with the trailing edge of the last pulse signal generated from the one-shot multivibrator 18.

In this embodiment, the switch 23 is set as shown in FIG. 4 in accordance with the externally input moving direction signal. Thus, the output signal from the inversion amplifier 22 is supplied to the adder 14.

In the apparatus of this embodiment, a signal similar to that shown in FIG. 2F is supplied to the compensation controller 15, thus braking the light beam actuator 5.

In addition, the apparatus of this embodiment can obtain the brake signal (FIG. 5I) having a pulse width varying in accordance with the moving speed of the light beam spot which approaches a target track position. This will be described in detail with reference to FIGS. 6 and 7.

Figure 6:
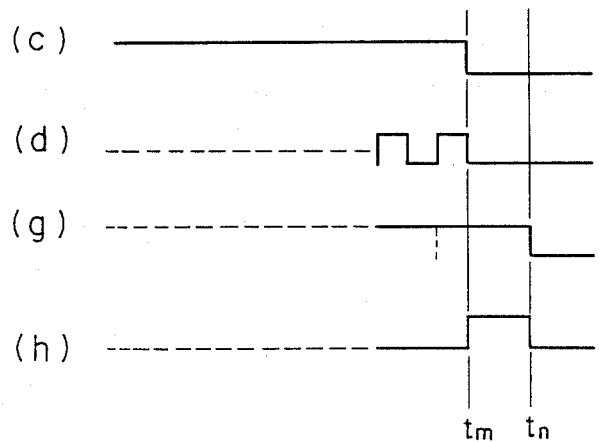
Figure 7:
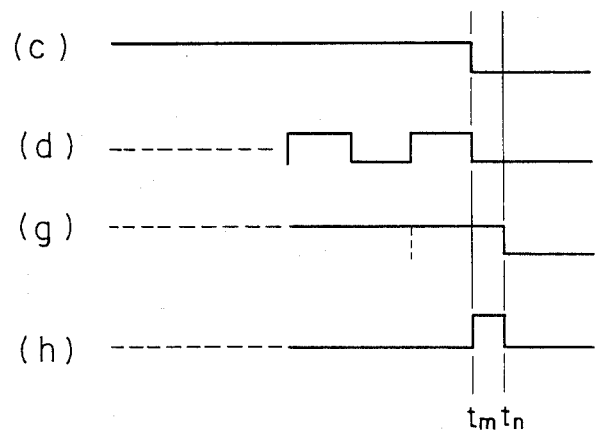

FIG. 6 is a timing chart when the moving speed of the light beam spot is relatively high, and FIG. 7 is a timing chart when the moving speed of the spot is relatively low. FIGS. 6C, 7C, 6D, 7D, 6G, 7G, 6H and 7H correspond to FIGS. 5C, 5D, 5G, and 5H.

When the moving speed is high, since the last pulse from the comparator 9 has a relatively narrow pulse width, as shown in FIG. 6D, an interval from time $t_m$ to time $t_n$ corresponding to the trailing edge of the last pulse from the one-shot multivibrator 18 which is triggered by the leading edge of the last pulse from the comparator 9, becomes relatively long, as shown in FIG. 6G. In this case, the pulse width of the output signal from the AND gate 20 becomes relatively wide, as shown in FIG. 6H, and the pulse width of the brake signal generated based thereon becomes wide, thus achieving relatively large braking force.

When the moving speed is low, since the last pulse from the comparator 9 has a relatively wide pulse width, an interval from time $t_m$ to time $t_n$ corresponding to the trailing edge of the last pulse from the multivibrator 18 becomes relatively short, as shown in FIG. 7G. In this way, the pulse width of the output signal from the AND gate 20 becomes relatively narrow, as shown in FIG. 7H, and that of the brake signal generated based thereon becomes also narrow, thus achieving relatively small braking force.

In the above embodiment, the output from the bias generator 11 is used for determining the threshold value of the comparator 9, but outputs from other voltage generating sources can be used.

Furthermore, a generation timing of the brake signal coincides with the timing when the light beam spot reaches the target track position. However, the brake signal can be generated at a timing when the beam spot reaches a position corresponding to 5 or 10 tracks before the target track position.

In the above embodiment, the braking operation is realized by adding the brake signal to the synthesized signal. However, according to the present invention, the braking operation can be realized by other methods.

Figure 2:
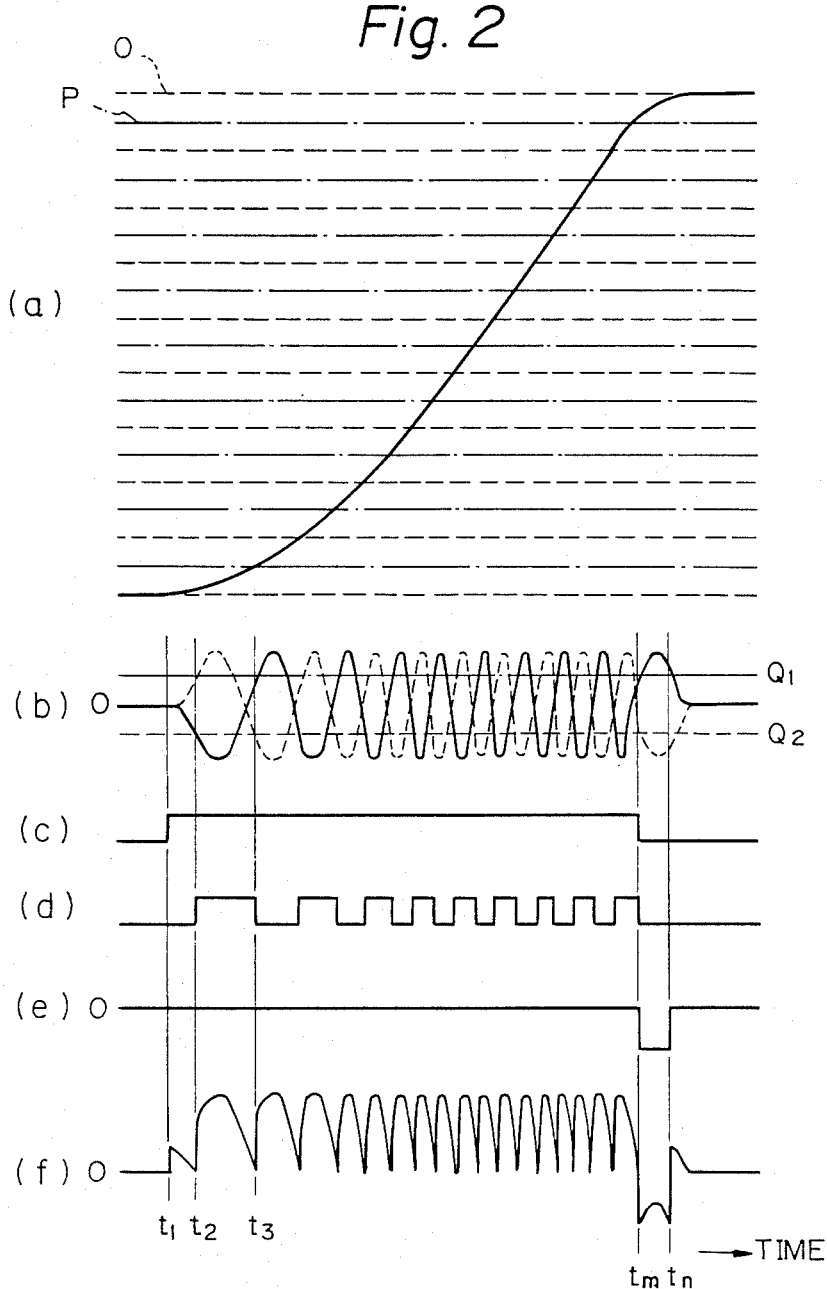
FIGS. 2(a) to 2(f) are timing charts for explaining the relationship between beam spot positions and various signals according to the present invention.
Figure 8:
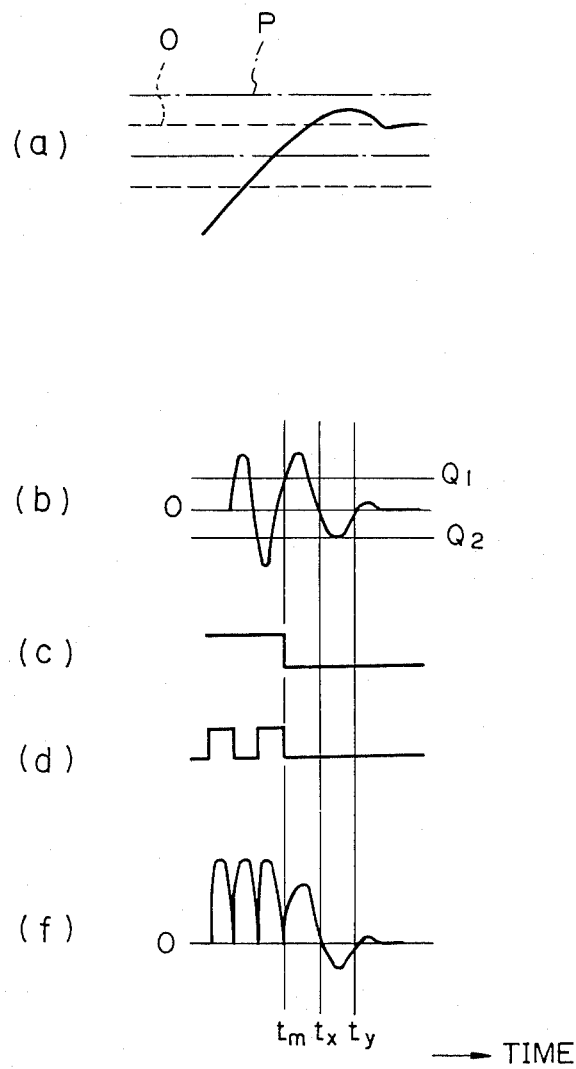

FIG. 8 is a timing chart showing such an embodiment like that in FIG. 2. In this embodiment, the same control as in FIG. 2 is performed until time $t_m$, and thereafter, the pulse signal shown in FIG. 2E is not added by the adder 14. Then, the light beam spot passes through a target track position at time $t_x$ due to its inertia force. For a predetermined period of time after time $t_x$, a negative signal shown in FIG. 8F is supplied to the compensation controller 15. Thereby, a gain of the controller 15 is increased so as to control the actuator 5 by larger braking force than that in the normal tracking operation. Note that an interval during which the gain is increased corresponds to the negative interval of the signal shown in FIG. 8F (i.e., time $t_x$ to $t_y$)

In this way, the light beam spot can effectively access the target track position.

In the above embodiments, the reproduction mode of the optical disk has been described. The present invention is effective when an optical magnetic disk and various other recording medium are used, and in data recording, reproduction, and erasure modes.

The recording medium is not limited to a disk shape, but can be any other medium in which data tracks are aligned parallel to each other.

FIG. 9 is a block diagram of an optical data recording/reproduction apparatus using the track access method according to another embodiment of the present invention. The same reference numerals in FIG. 9 denote the same parts as in FIG. 1, and a detailed description thereof will be omitted.

In this embodiment, a speed detector 17 detects a frequency of a tracking error signal so as to detect a moving speed of a light beam. A polarity switching signal generator 24 detects the output signal from the speed detector 17, and generates a polarity switching signal for switching a switch 8.

The tracking error signal will be described below.

FIG. 10 shows the relationship between track positions and position signals.

FIG. 10A is a perspective sectional view of a disk 1 cut in its radial direction. In FIG. 10A, hatched portions correspond to tracks, and tracks are arranged on the disk 1 at distances of 1.6 μm to 2 μm.

FIG. 10B shows the tracking error signal generated from a photodetector 6 in FIG. 9 when a light beam OB is radiated above the tracks and is moved in a direction substantially perpendicular to the track in FIG. 2. The tracking error signal represents a position of the light beam relative to the track position. Since a plurality of tracks are aligned on the disk 1, the tracking error signal becomes periodical.

The tracking error signal generated from the photodetector 6 is supplied to a compensation controller 15 through the switch 8 and an adder 14. The controller 15 has a phase compensation circuit and a drive circuit for controlling a light beam actuator 5. Note that the photodetector 6, the switch 8, the adder 14, and the compensation controller 15 constitute a control loop.

In a normal information signal recording/reproduction mode, the switch 8 is set at a position shown in FIG. 9, and the light beam is controlled by the control loop so as to be always located on the track positions. The light beam actuator 5 is driven by the tracking error signal with reference to a predetermined point on the track (e.g., a point A).

The tracking error signal from the photodetector 6 is inverted by an inverter 7 and is supplied to the switch 8. Therefore, when the switch 8 is switched alternately, the positive and negative tracking error signals applied to the adder 14 appear alternately.

A procedure for moving the light beam along the track in a random access mode will be described.

Basically, when the light beam is located at the point A in FIG. 10, the light beam is moved to a point B upon application of a bias voltage. When the switch 8 is then switched, the light beam position is controlled by using the inverted tracking error signal shown in FIG. 10C, thereby locating the light beam at a point C shown in FIG. 10B'. After the light beam slightly passes by the point C due to inertia force of the light beam actuator, the switch 8 is switched to obtain the positive control polarity again, thus locating the light beam at a point D shown in FIG. 10B. In this way, the light beam can be moved, and when the above-mentioned operation is repeatedly performed, the light beam crosses the tracks.

This operation will be explained in detail. A moving direction signal is supplied to the bias generator 11 so as to generate a positive or negative bias voltage. The positive or negative bias voltage is supplied to the adder 14 through the bias switch 12 when the light beam is moved. The counter 10 counts the polarity switching signals generated by the polarity switching signal generator 24 so as to detect the number of tracks the light beam has passed, thereby turning on or off the switch 12.

When the count start signal is supplied to the counter 10, the bias switch 12 is turned on, and a positive or negative bias voltage corresponding to the light beam moving direction is applied from the bias generator 11 to the adder 14. The bias voltage is then applied to the light beam actuator 5 through the compensation controller 15. In response to this, the light beam is moved slightly in the moving direction from the central portion of the track. More specifically, the light beam is moved to the point B shown in FIG. 10B.

FIG. 11 mainly shows signal waveforms when the light beam crosses the tracks.

FIG. 11A illustrates when the light beam crosses the tracks, in which a light beam trace is indicated by n, tracks are indicated by broken lines O, and intertracks are indicated by dotted lines P. FIG. 11B shows the tracking error signal, in which $Q_1$ and $Q_2$ indicate threshold levels for a comparator in the generator 24. FIG. 11C shows a control signal for controlling the bias switch 12; FIG. 11D, the output signal from the generator 24; and FIG. 11F, a signal input to the compensation controller 15.

The operation of the apparatus of this embodiment will be described with reference to FIG. 11.

The bias switch 12 is enabled by the count start signal and a bias voltage is applied to the controller 15. Then, the light beam starts moving slightly in the moving direction from the central portion of the track. Thus, the tracking error signal shown in FIG. 11B reaches a point R on the threshold level $Q_2$. At this timing, the generator 24 switches the polarity of the polarity switching signal.

Upon generation of the polarity switching signal, the position control loop is inverted, and the light beam passes by a point S shown in FIG. 11A by drive force for moving the light beam toward the intertrack P. When the tracking error signal reaches a point T on the threshold level $Q_1$, the generator 24 switches the polarity of the polarity switching signal again so as to invert the position control loop to be positive, thereby locating the light beam on the track. Upon the above operation sequence, the light beam moves to the adjacent track. When the above-mentioned operation is repeated a required number of times, the light beam can access a desired track position.

Since a track number to which the light beam is moved is prestored in the counter 10, the counter 10 counts the polarity switching signals. When the count reaches the preset track number, the counter 10 causes the bias switch 12 to be turned off. The light beam can be moved to a desired track position by the above operation.

The operation of the detector 17 and the generator 24 will be described in order to accurately move the light beam to a target track position. The relative speed signal generated from the speed detector 17 is supplied to the generator 24, and is used for producing the polarity switching signal.

The generator 24 produces a predetermined voltage level based on the relative speed signal, the input count value, and the output signal from the counter 10. The tracking error signal is converted into a binary signal by a comparator using the predetermined voltage level as a threshold level, thus producing the polarity switching signal. In this way, the light beam can travel at a desired speed.

FIG. 12 is a timing chart when the light beam runs across the tracks under speed control.

FIG. 12J shows the relative speed signal generated from the speed detector 17, and FIG. 12K shows a target speed signal based on a target speed pattern produced from the count value (i.e., the number of crossed tracks).

A moving speed pattern of the light beam is produced based on the count value (i.e., the number of crossed tracks) input to the generator 24. The speed pattern serves as a target moving speed of the light beam. For example, the speed pattern shown in FIG. 12K is produced, and the target speed signal corresponding to the speed pattern is produced based on the output from the counter 10 (i.e., the number of tracks the light beam crossed).

The threshold level of the comparator in the generator 24 is determined based on an error between the target speed signal and the relative speed signal. If the target speed pattern is set as shown in FIG. 12K, since the light beam moving speed (FIG. 12J) is lower than the target speed, the absolute value of the threshold levels $Q_1$ and $Q_2$ is decreased, thus requesting acceleration. As a result, when the moving speed approaches the target value, the threshold levels $Q_1$ and $Q_2$ (FIG. 12B) approach a certain value. When the moving speed reaches the target value, it is maintained constant.

When the light beam comes closer to the target track position, a low constant speed is set as the target speed based on the target speed pattern (FIG. 12K) (so as not to stop the light beam before it reaches the target track position), thus decelerating the light beam. Then, the absolute value of the threshold levels $Q_1$ and $Q_2$ is increased, and the moving speed of the light beam is decreased. In this way, the light beam can reach the target track position at a constant speed.

In the above operation sequence, when the threshold levels for the comparator for converting the tracking error signal into a binary signal are varied, the moving speed of the light beam is controlled. More specifically, as shown in FIG. 13I, when the absolute value of the threshold level is small, an average level (an average value in each of positive and negative half cycles of the signal) of a signal f' obtained by switching the switch 8 is high. However, when the absolute value of the threshold level is high as shown in FIG. 13(ii), a signal f' having the low average level is obtained. This average level corresponds to the driving force of the light beam actuator 5. Therefore, when the absolute value of the threshold level is small, the large driving force is applied to the actuator 5, and the moving speed of the light beam is increased. However, when the absolute value of the threshold level is large, since small driving force is applied to the actuator 5, the moving speed of the light beam is decreased due to resistive force (e.g., frictional force against the actuator 5).

In FIG. 12, the average level of the input signal to the compensation controller 15 is varied in accordance with a change in threshold level so as to change the driving signal supplied to the actuator 5. In this case, during a constant moving speed interval of time $t_1$ to $t_2$, the driving force from the actuator 5 balances the resistive force (e.g., frictional force) against the actuator 5.

In this way, when the moving speed of the light beam is detected and is controlled based on the detected speed, the light beam can be moved at a desired speed or in accordance with a desired speed pattern.

Figure 14:
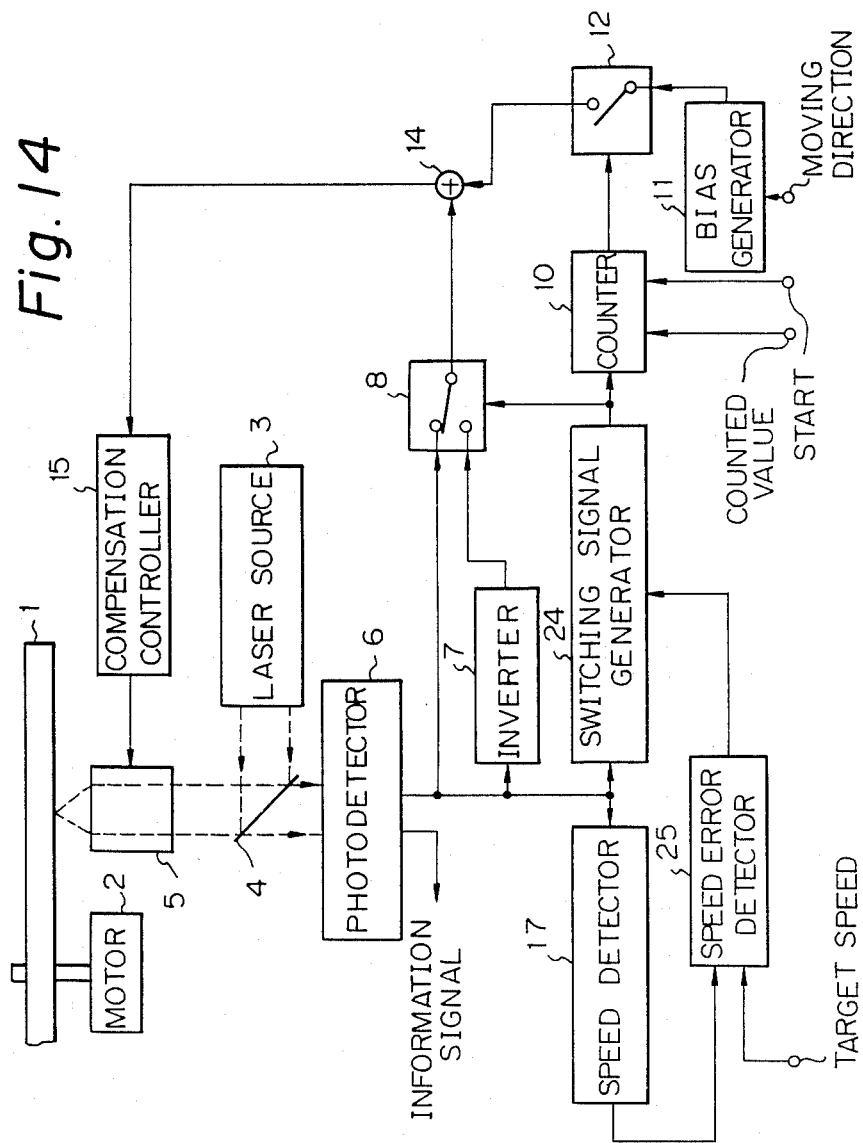

FIG. 14 is a block diagram showing another embodiment of the present invention. In this embodiment, the same reference numerals in FIG. 14 denote the same parts as in FIG. 9.

In FIG. 14, a portion, for detecting the speed error, of the switching signal generator 24 in FIG. 9 is shown as an external component (i.e., a speed error detector 25), which receives an external target speed. In this case, target speed, count value, count start, and moving direction signals can be input by a microcomputer.

In the embodiments shown in FIGS. 9 and 14, in order to accelerate the light beam, a polarity switching timing of the generator 24 is varied. This can be achieved not only by changing the threshold level of the comparator in the generator 24 but also by any means which detects the tracking error signal and the speed signal (or speed error signal) and produces a polarity switching signal so as to control the light beam moving speed.

Figure 15:
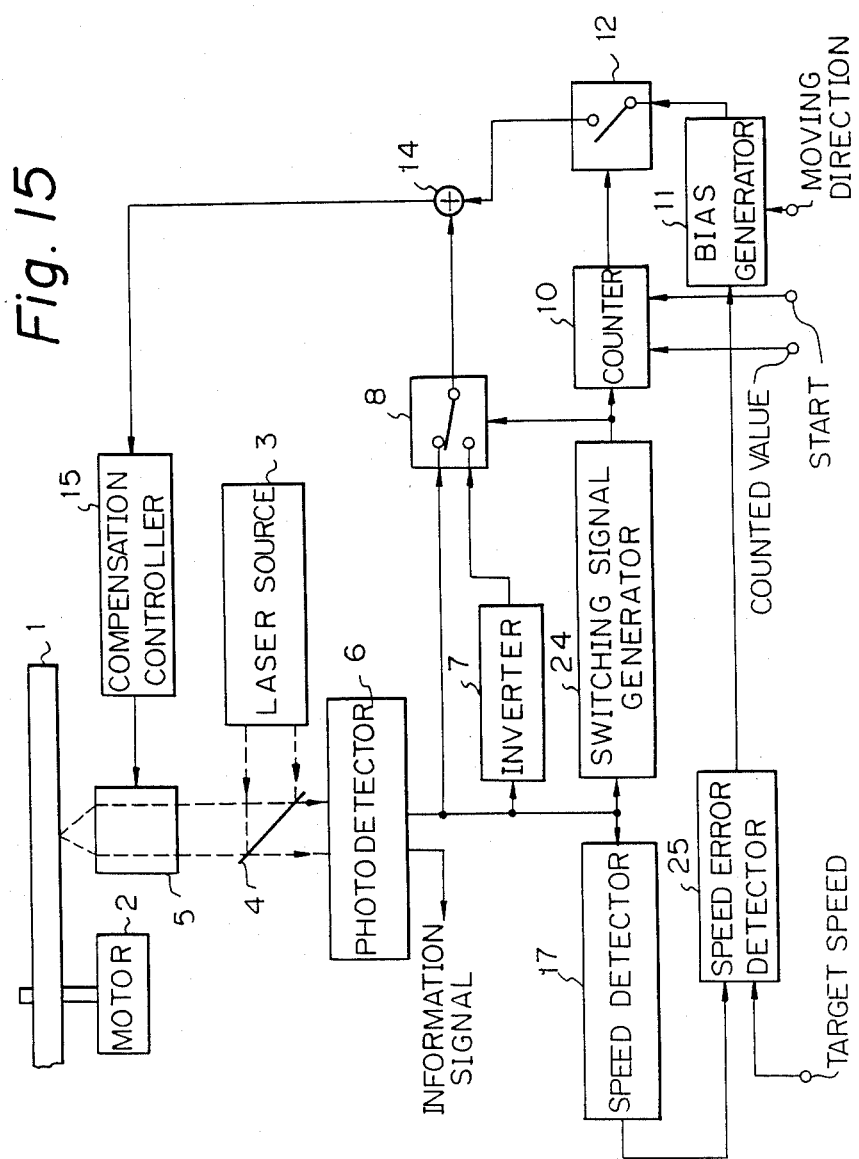

FIG. 15 is a block diagram showing another embodiment of the present invention. In this embodiment, the bias voltage is changed in order to accelerate the light beam. The acceleration speed can vary widely when compared with the embodiments shown in FIGS. 9 and 14.

Figure 16:
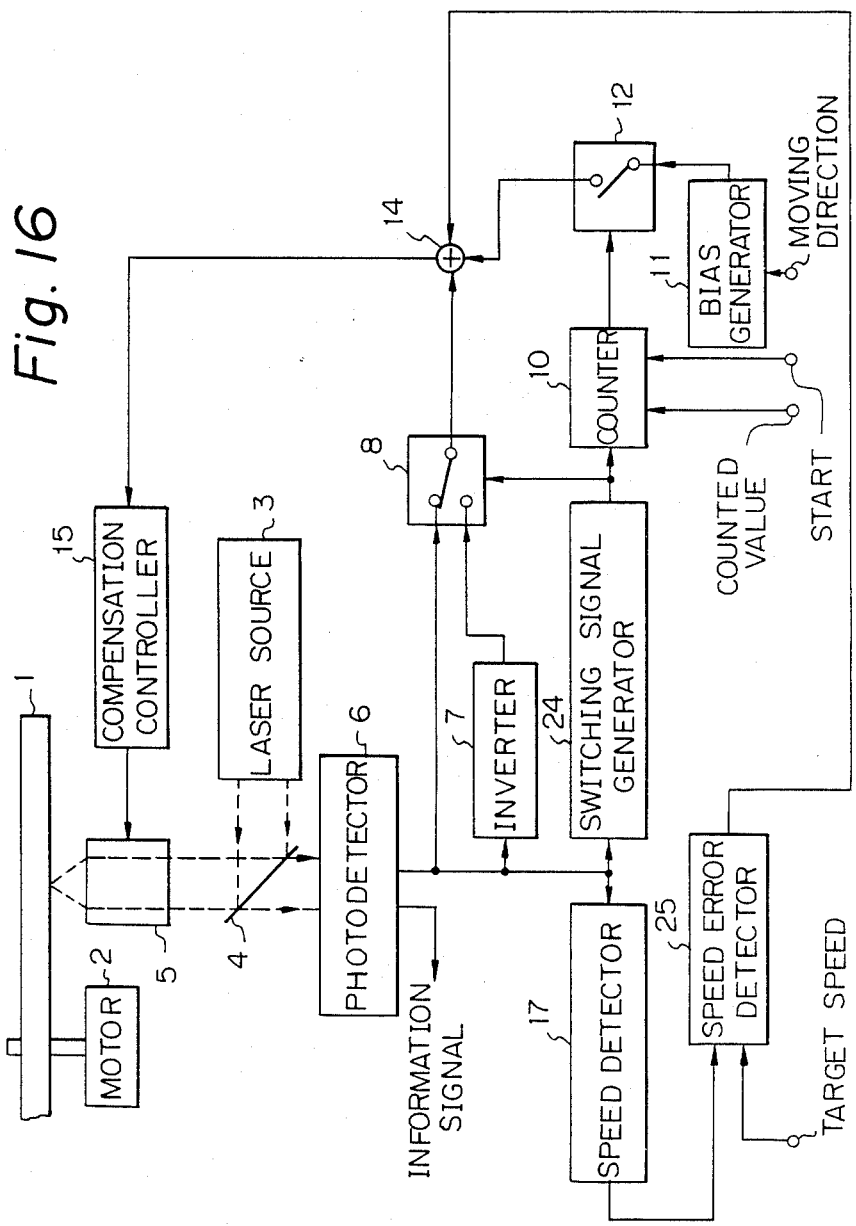

In an embodiment shown in FIG. 16, a speed error signal is applied to a position control loop in order to accelerate the light beam.

Figure 17:
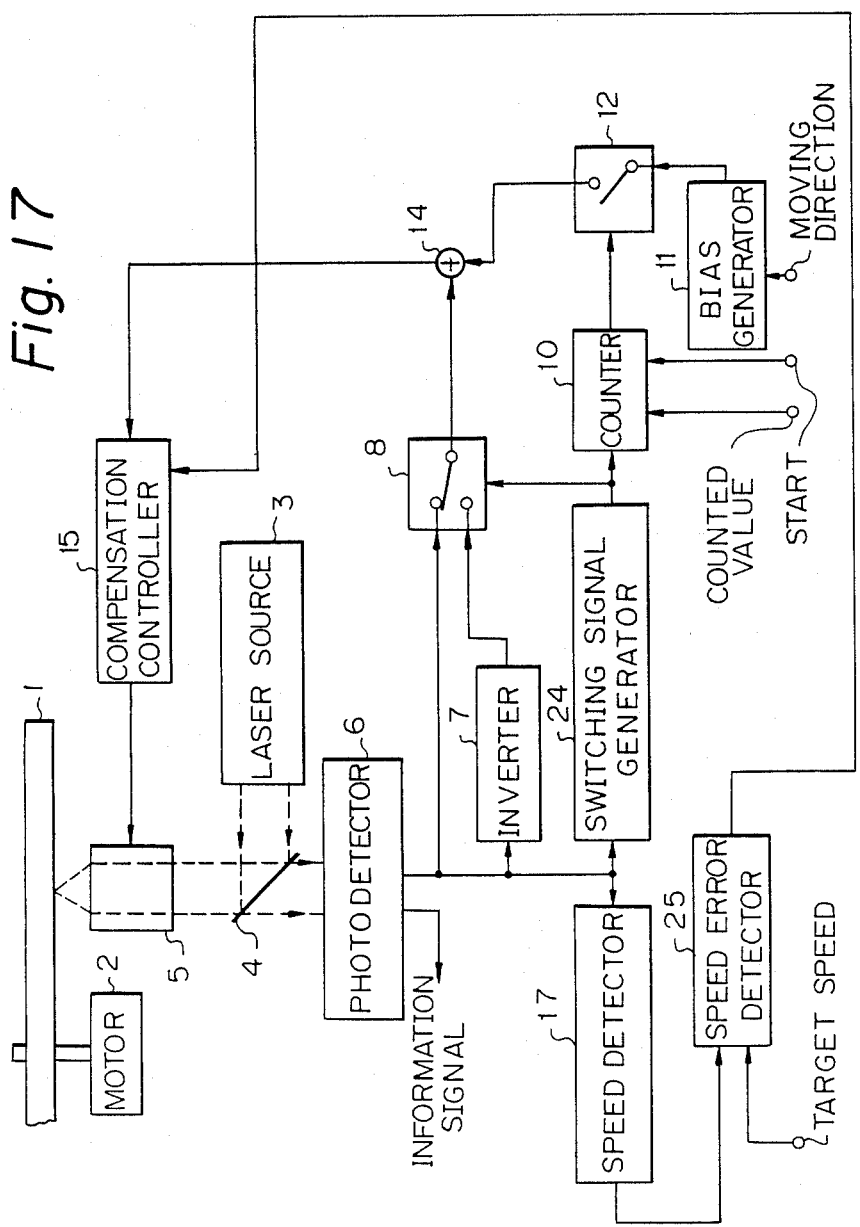

In an embodiment shown in FIG. 17, a speed error signal is supplied to a compensation controller so as to change a gain of the controller in order to accelerate the light beam.

Figure 18:
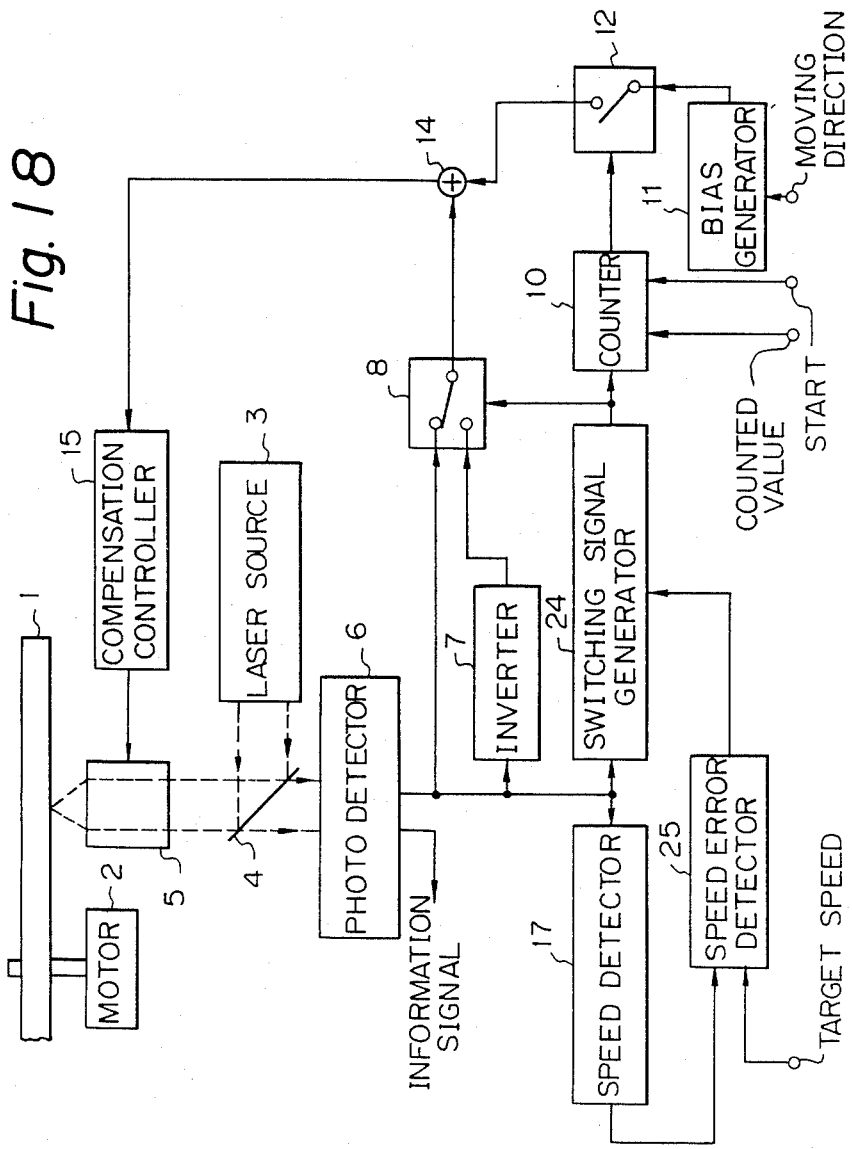

In an embodiment shown in FIG. 18, a light beam speed is detected by a total light amount signal generated from a photodetector 6. The total light amount signal corresponds to the output sum from a plurality of photodetection elements in the photodetector 6, and a tracking error signal corresponds to the output difference among the plurality of the photodetection elements. The total light amount signal and the tracking error signal have a phase difference of 90° in a direction substantially perpendicular to tracks (i.e., in the radial direction of a disk).

Figure 19:
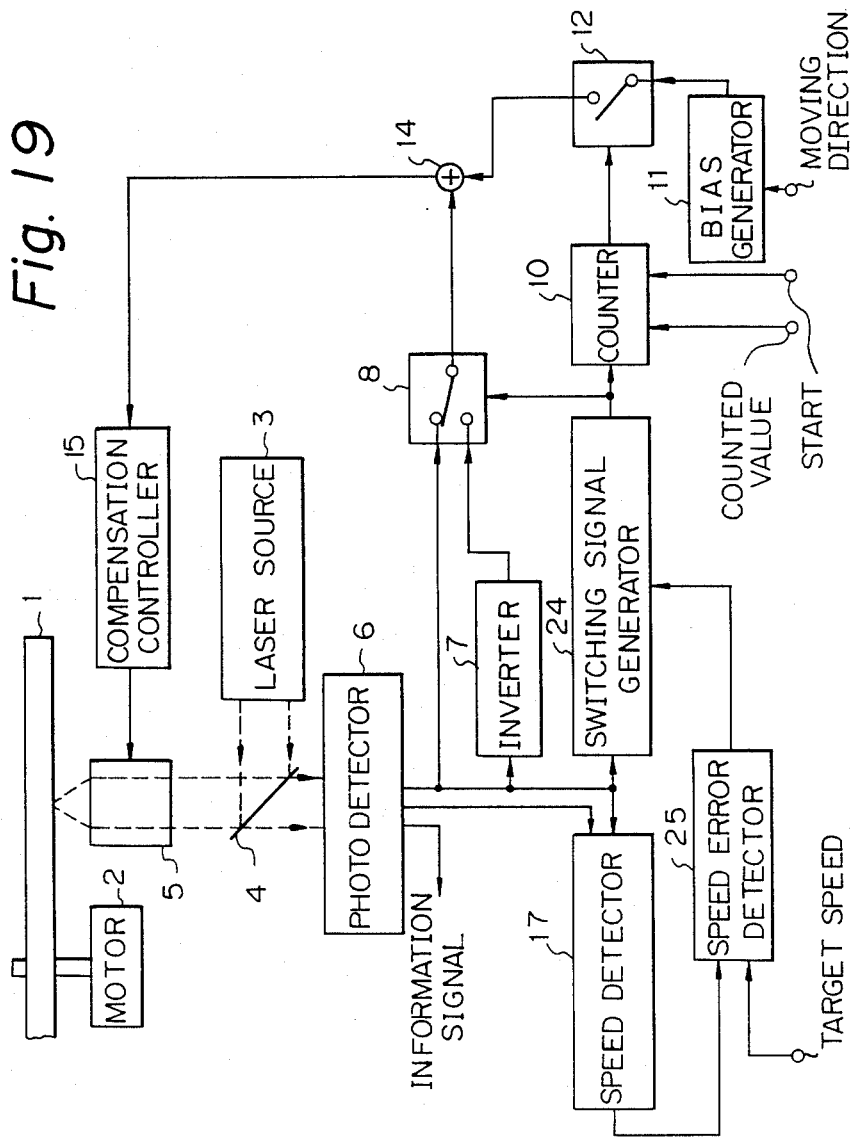

In an embodiment shown in FIG. 19, a tracking error signal is supplied to the speed detector 17 shown in FIG. 18 in addition to the total light amount signal. In this case, a moving direction can be detected by a phase difference between the total light amount signal and the tracking error signal. In addition, speed detection precision can be improved.

The speed detector 17 can detect a speed based on not only the output signal from the photodetector 6 but also the output signal from a switching signal generator 24. If a speed of a light beam relative to a track position can be detected, any means can be used. For example, if two optical systems shown in FIG. 9 are used, one is fixed at a certain position on the track, and the other is arranged to be movable. In this case, when a distance or inclination between two light beam actuators is detected, a relative speed can be detected.

Figure 20:
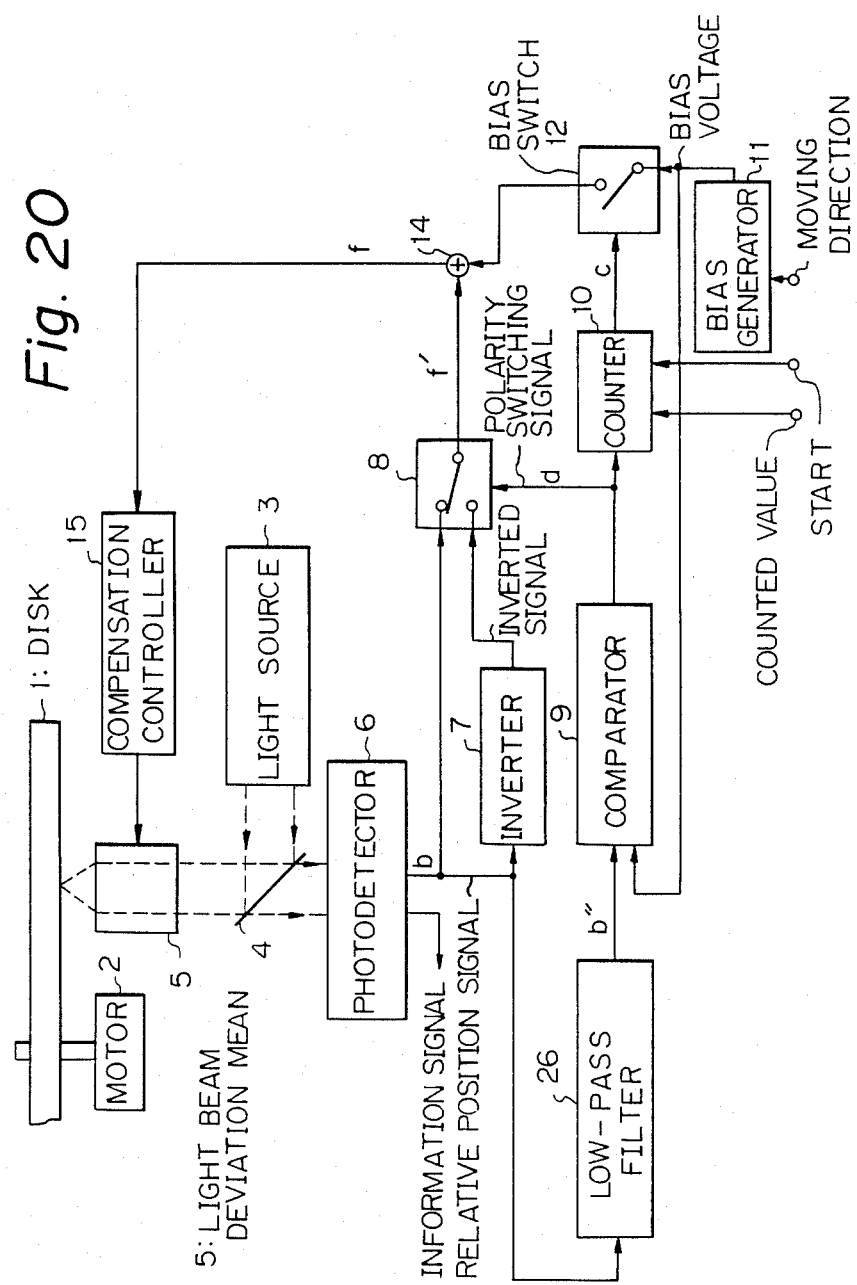

FIG. 20 is a block diagram showing another embodiment of the present invention. The same reference numerals in FIG. 20 denote the same parts as in FIG. 1, and a detailed description thereof will be omitted.

In this embodiment, a signal passing through a low-pass filter 26 is compared with the output signal from a bias generator 11 so as to produce a polarity switching signal. The low-pass filter 26 and a comparator 10 have a switching control function of a switch 8 in accordance with the frequency of a tracking error signal, thus controlling a light beam moving speed.

Figure 21:
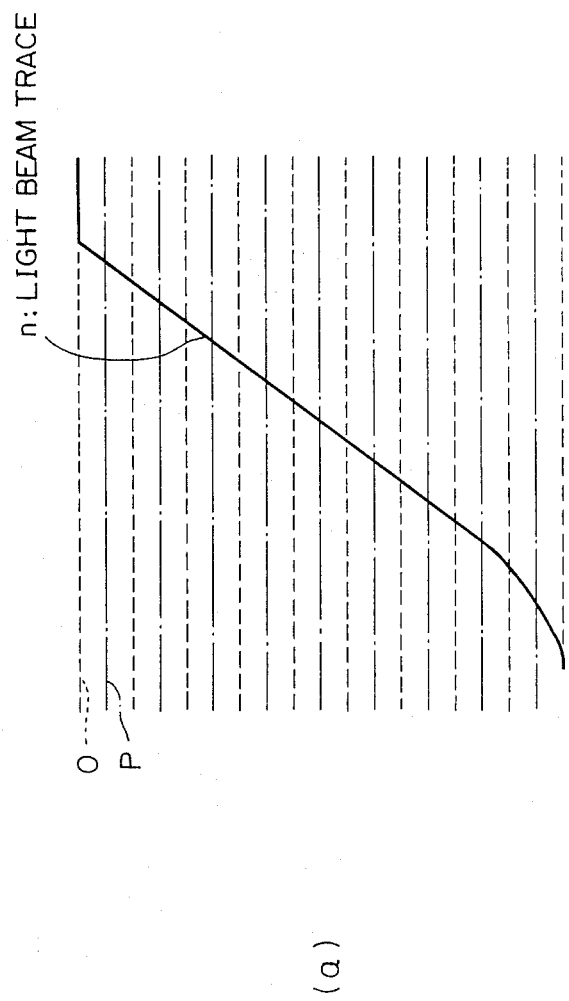

FIG. 21 is a timing chart when the light beam crosses the tracks in this embodiment. FIGS. 21A, 21B, 21C, 21D and 21F substantially correspond to FIGS. 12A, 12B, 12C, 12D and 12F.

FIG. 21B'' shows a signal which is obtained after the tracking error signal (FIG. 21B) passes through the low-pass filter 26, and which is supplied to one input terminal of the comparator 9. The light beam moves as shown in FIG. 21A. More specifically, the light beam moving speed is gradually increased from when it starts moving, and thereafter is maintained at a constant speed. This operation will be apparent from the following descriptions of a polarity switching signal generation procedure.

FIG. 21B" shows the signal after the tracking error signal passes through the low-pass filter 26. As the frequency of the tracking error signal increases (i.e., as the relative speed of the light beam increases), the amplitude thereof becomes small and the phase thereof is delayed. When this signal is compared with a certain level (e.g., a bias voltage), a generation timing of the polarity switching signal as an output signal from the comparator 9 can be changed.

A method of accelerating/decelerating the light beam using the low-pass filter will now be described.

Figure 22:
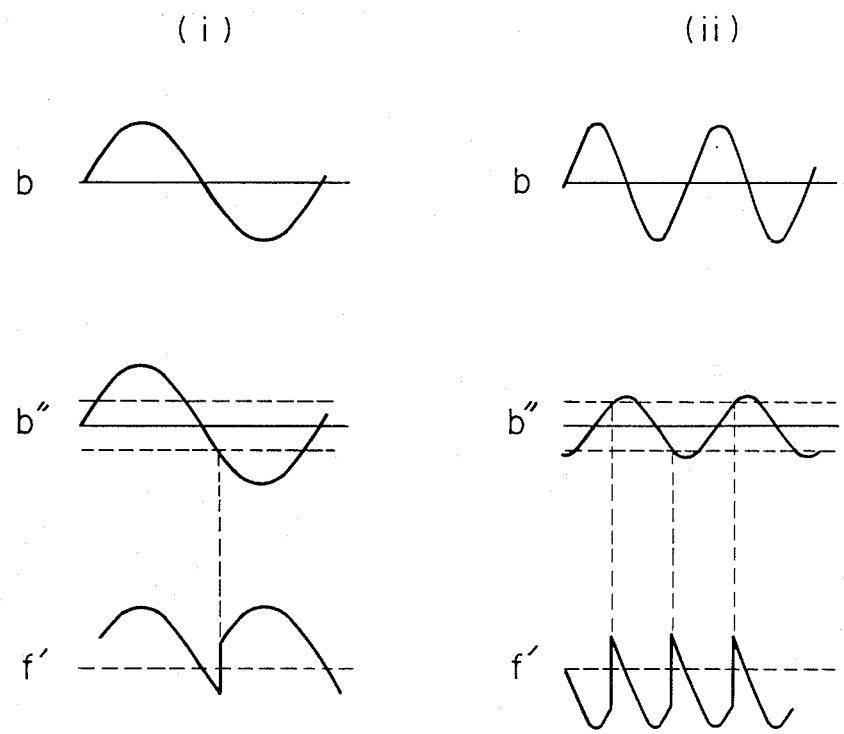

As shown in FIG. 22I, when the tracking error signal has a low frequency, a signal b" passing through the low-pass filter 26 exhibits no decrease in amplitude and no delay in phase, and a signal f' has the high average level. The signal f' is obtained by switching the switch 8 using the signal b" converted into a binary signal at a certain threshold level. However, as shown in FIG. 22(ii), when the tracking error signal has a high frequency, the amplitude of the signal b" passing through the low-pass filter 26 is decreased and the phase thereof is also delayed. In addition, the signal f' obtained as above has the low average level.

The average level corresponds to the driving force of the light beam actuator. Therefore, when the tracking error signal has the low frequency, the light beam actuator is accelerated; otherwise, it is decelerated.

When the moving speed of the light beam is increased in FIG. 21, the average level of the signal input to the compensation controller 15 is decreased in accordance with the above principle, as shown in FIG. 21F. For this reason, the light beam is braked, and the moving speed thereof is decreased. In this case, the braking force is decreased accordingly, and the moving speed of the light beam becomes constant. In this way, since the light beam is maintained at a constant speed, it can be moved stably.

Note that the order of the low-pass filter can be set as desired. The low-pass filter preferably has certain frequency characteristics where the phase is flat and the amplitude is decreased, or where the amplitude is flat and the phase is delayed.

Figure 23:
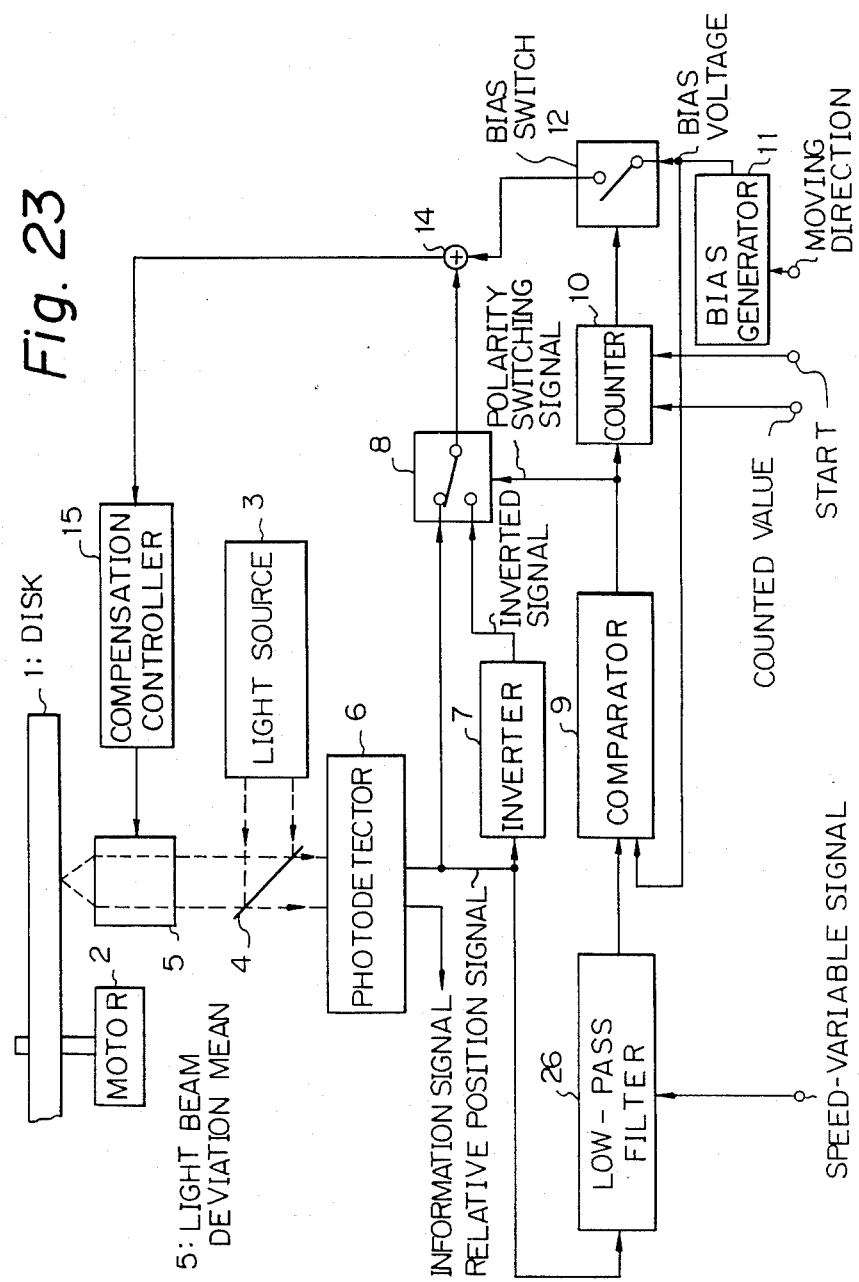

FIG. 23 is a block diagram showing an arrangement for applying a speed variable signal to the low-pass filter 26.

With this arrangement, the frequency characteristics of the low-pass filter 26 are changed by a given speed variable signal, thus enabling desirable speed control. In this case, a low-pass filter, which can change a time constant, need only be used.

A track access method in which the above-mentioned light beam actuator and movement of an optical head are combined will be described.

In a random access mode of a conventional optical disk apparatus, after an optical head is aligned roughly, fine alignment is performed by driving a tracking actuator, thus locating the light beam at a target track position.

In order to access a target track position, when an optical disk having numbered tracks is used in the conventional apparatus, a currently traced track number is detected so as to obtain a distance between the current and target track positions, and the optical head is roughly moved based on the obtained distance using a linear motor or the like. Since the optical head is moved at high speed, a speed curve corresponding to the obtained distance is produced, and the optical head is moved to coincide with the speed curve, thus accessing near the target track position.

After the rough position alignment of the head by the linear motor, the track number is detected again, and the light beam is moved to the target position based on the updated distance by driving the tracking actuator, thus completing the track access.

In the conventional apparatus, after the light beam is roughly aligned using the linear motor, it must be further driven by the tracking actuator, thus prolonging a total access time. On the other hand, an apparatus, which counts the number of tracks the light beam has passed using a tracking error signal so as to accurately access a target track position has been proposed. However, in this apparatus, a track crossing direction of the light beam must be detected each time to eliminate a count error caused by shift in tracks due to eccentricity, resulting in cumbersome operation.

Furthermore, when the optical head is accelerated, the tracking actuator must be stably operated in order to reduce vibration of the tracking actuator.

Figure 24:
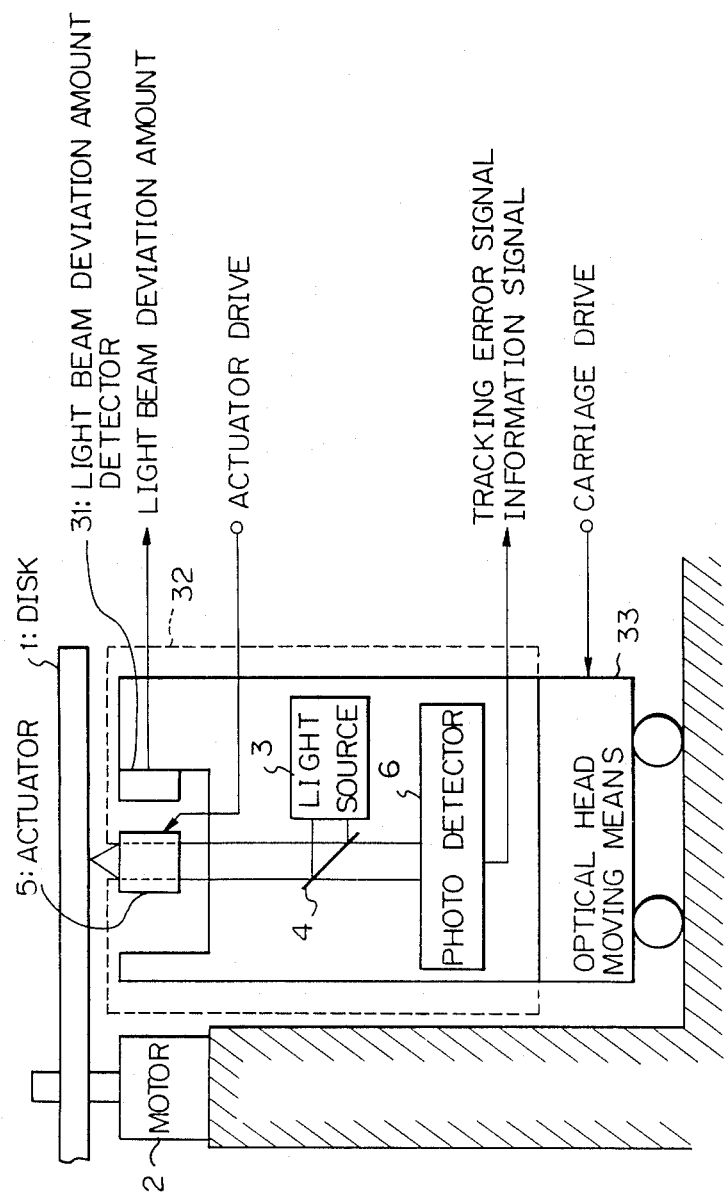
FIG. 24 is an illustration showing an optical system and a mechanical driving system of an optical disk apparatus according to an embodiment of the present invention.

FIG. 24 is a block diagram showing another embodiment of the present invention. The components 1 to 6 in FIG. 24 are the same as those shown in FIG. 1. A light beam deviation amount detector 31 detects a light beam deviation amount due to an actuator 5. The apparatus of this embodiment comprises an optical head 32 and a carriage 33 as an optical head moving means in addition to the above components.

In this embodiment, a disk 1 is coupled to the shaft of a motor 2, and is rotated at a constant speed (e.g., 1,800 rpm). Then, a light beam from a light source 3 is focused into a small spot on the disk 1 through a half mirror 4 and the actuator 5, thus writing information on the disk 1. Light reflected from the disk 1 is detected by a photodetector 6 so as to read the information. When information is written in or read out from a predetermined position of the disk 1, the carriage 33 and the actuator 5 are driven at the same time so as to move the light beam. When the actuator 5 is driven, the light beam can accurately access a target track position against transverse shift in tracks due to eccentricity of the disk 1.

The detector 31 comprises, e.g., a reflection type photoreflector, and detects a relative distance between the optical head 32 and an objective lens of the actuator 5, thus obtaining the light beam deviation amount. The carriage 33 moves the optical head 32 in the direction perpendicular to the tracks by using, e.g., a linear motor.

Figure 25:
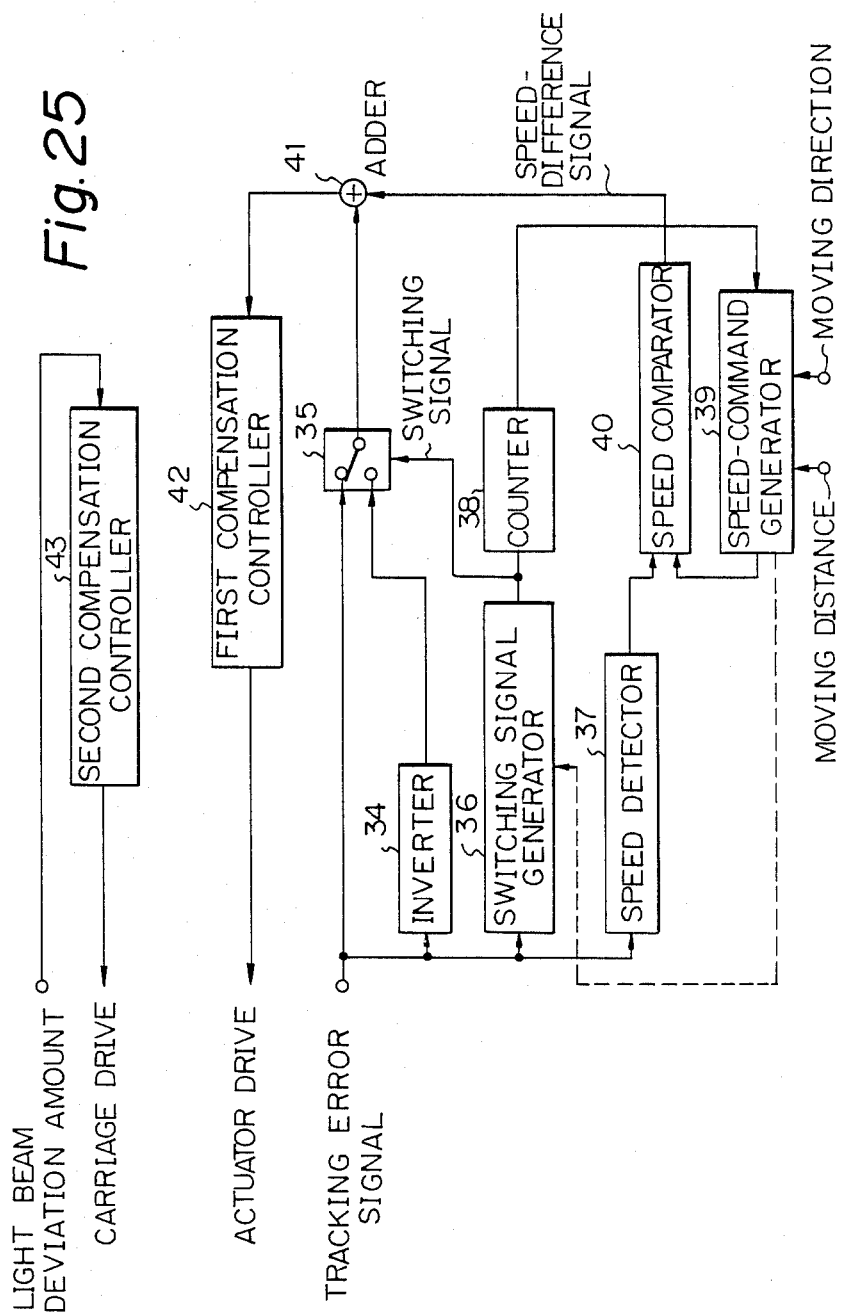
FIG. 25 is a block diagram of a track access control system in the apparatus of the embodiment.

FIG. 25 shows a block diagram showing a circuit arrangement of this embodiment.

An inverter 34 inverts the polarities of the tracking error signal generated from the photodetector 6 so as to produce an inverted tracking error signal (which corresponds to the inverter 7 in FIG. 1). A switch 35 switches the tracking error signal and the inverted signal thereof, and corresponds to the switch 8 shown in FIG. 1. A switching signal generator 36 detects the tracking error signal, and produces a switching signal for switching the switch 35 (corresponding to the generator 24 in FIG. 9). A speed detector 37 detects a moving speed of the light beam using the tracking error signal, and corresponds to the detector 17 in FIG. 9.

A counter 38 counts the polarity switching signals, and supplies the count to a speed command generator 39 (corresponding to the counter 10 shown in FIG. 1). A speed command generator 39 generates a desired speed command, and receives the count output from the counter 38 or a moving distance and a moving direction to a target track position in order to access the light beam by an external device.

A speed comparator 40 compares the outputs from the speed detector 37 and the speed command generator 39 so as to produce a speed difference signal, and corresponds to the comparator 25 shown in FIG. 14. An adder 41 adds the speed difference signal to the tracking error signal passing through the switch 35, and corresponds to the adder 14 in FIG. 1. A first compensation controller 42 controls the actuator 5 based on the output signal from the adder 41, and corresponds to the controller 15 in FIG. 1. A second compensation controller 43 receives the light beam deviation amount by the actuator 5, and controls the carriage 33 based thereupon.

Figure 26:
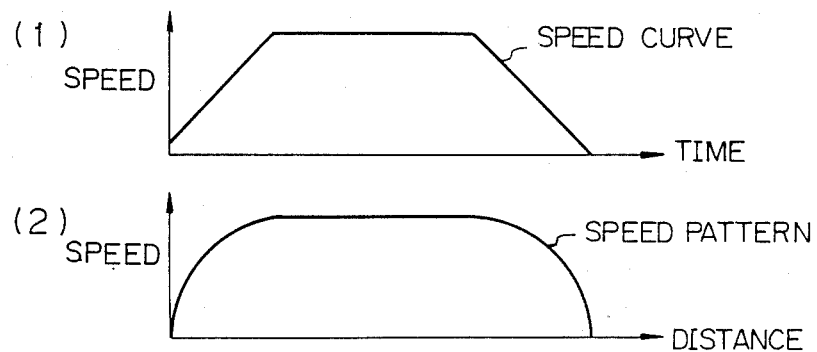
FIG. 26 is a graph showing a target speed of a light beam relative to a track position.

In order to move the light beam, the number of tracks the light beams has crossed and the moving direction thereof are input to the speed command generator 39, and a speed curve serving as a control target is produced (e.g., a speed curve having trapezoidal characteristics shown in FIG. 26(1)). When this speed curve is converted into characteristics which represent a speed as a function of a moving distance, a speed pattern shown in FIG. 26(2) is obtained. The speed command generator generates a target speed in accordance with the output from the counter 38 (the output corresponding to the moving distance of the light beam) based on the obtained speed pattern.

At access start timing, since a speed of the light beam relative to the track is zero, the speed comparator 40 generates a predetermined voltage in accordance with a difference between the relative speed and the target speed in the speed pattern. The voltage is applied to the adder 41, and causes the actuator 5 to start moving through the first compensation controller 42. Thus, in response to this voltage, the light beam is moved slightly from the central portion of the track.

Figure 27:
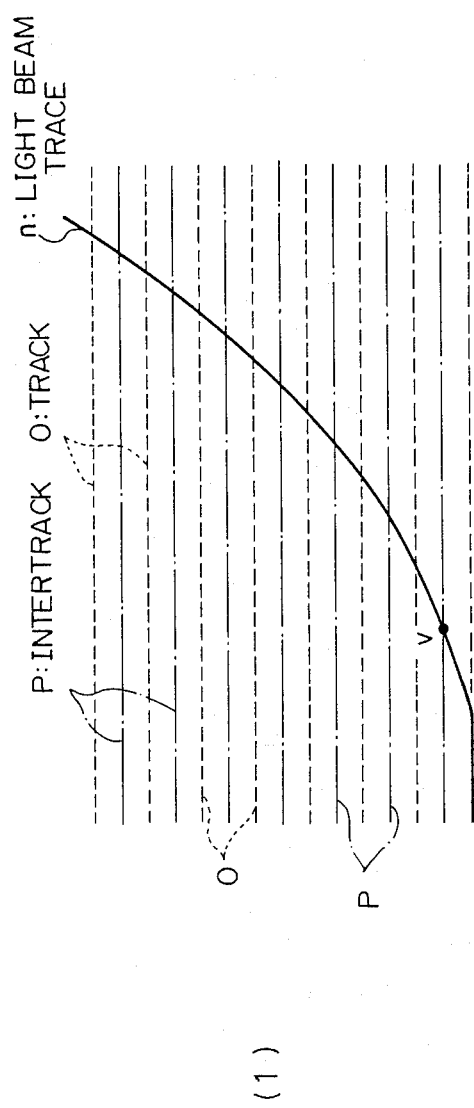
FIGS. 27(1) to 27(6) are illustrations when the light beam crosses tracks upon speed control.

FIG. 27 shows respective signal waveforms when the light beam is moved while the carriage 33 is stopped.

FIG. 27(1) illustrates when the light beam crosses the tracks, in which a light beam trace is indicated by n; tracks, O; and intertracks, P. FIG. 27(2) shows the tracking error signal, in which $Q_1$ and $Q_2$ are threshold levels of a comparator arranged in the generator 36.

FIG. 27(3) shows the target speed signal generated from the generator 39. The target speed signal is substantially equal to the speed of the light beam relative to the track because speed control is performed by a loop consisting of the speed detector 37 and the speed comparator 40. FIG. 27(4) shows the polarity switching signal, FIG. 27(5) shows the input signal to the first compensation controller 42, and FIG. 27(6) shows the light beam deviation amount signal.

The operation of the apparatus of this embodiment will be described with reference to FIG. 27.

The light beam starts moving in a predetermined direction in response to the output signal from the speed comparator 40. Upon this movement, the tracking error signal (FIG. 27(2)) appears, and when it reaches a point u corresponding to the threshold level $Q_2$, the generator 36 generates the polarity switching signal, which switches the switch 35.

Then, the tracking error signal in the position control loop is inverted, and the light beam reaches a point v (FIG. 27(1)) by driving force toward an intertrack. The light beam passes by the point v due to inertial force of the actuator 5, or driving force generated by a deviation from the target speed, and the tracking error signal then reaches point w corresponding to the threshold level $Q_1$. At this time, the generator 36 generates the switching signal for switching the switch 35, and the position control polarity of the light beam is inverted to be positive, thus moving the light beam onto an adjacent track.

When the above operation is repeated, the light beam can be moved sequentially. In this case, the speed command generator 39 performs the speed control with reference to the target speed. In the above description, the carriage 33 is stopped, and the light beam deviation amount shown in FIG. 27(6) is produced only by the actuator 5. More specifically, the light beam deviation amount indicates a position of the objective lens in the actuator 5 relative to the optical head. As described above, the light beam travels across the tracks.

The driving operation of the carriage 33 will now be described.

First, the carriage 33 is driving so as to make zero the light beam deviation amount generated by the actuator 5. In this case, the carriage 33 follows the light beam moved by the actuator 5. In other words, the carriage 33 follows the actuator 5.

The light beam moves in accordance with the speed curve shown in FIG. 26(1). Thereafter, when the light beam speed becomes zero (or low), the light beam reaches the target track position. In this case, however, although the light beam has reached the target track position, the polarity switching signal may switch the switch 35 due to a control error caused by an erroneous operation of the generator 36. In order to prevent this, the fact that the light beam has reached the target track position need only be signalled to the generator 36 so as not to switch the switch 35.

The light beam deviation amount detector 31 can be a reflection type photoreflector, a laser interferometer, a contact type deviation meter, a detector for detecting a shift in optical axis of a parallel light beam, a detector for detecting an angle of a Galvano mirror, or the like.

Figure 28:
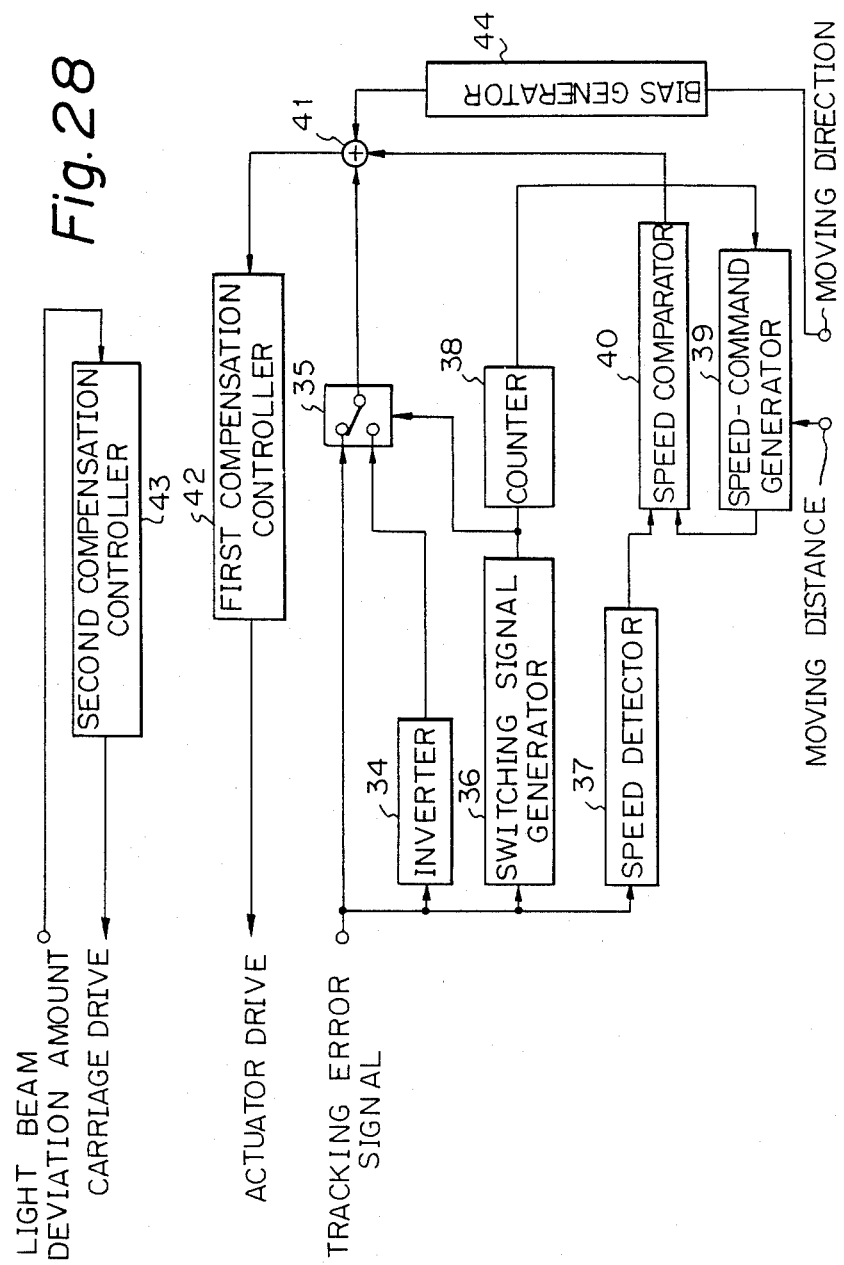
FIG. 28 is a block diagram showing another embodiment of the present invention.

FIG. 28 is a block diagram showing another embodiment of the present invention.

In this embodiment, a bias generator 44 is added to the apparatus in the embodiment shown in FIG. 25.

The bias generator 44 receives a moving direction signal of a light beam in the access mode, and generates a positive or negative bias voltage in accordance with the moving direction when the access operation starts. It can also gradually decrease the bias voltage in a desired period of time, or continuously generate the bias voltage from when the access operation starts until it ends.

The bias generator 44 generates the bias voltage in accordance with the moving direction of the light beam based on an external input, and the bias voltage therefrom causes an actuator 5 through a first compensation controller 42 to drive in the moving direction of the light beam.

In the embodiment shown in FIG. 28, since the moving direction of the light beam is determined when the access operation starts, it need not be detected as long as stable control operation is made. Therefore, since a speed detector 37 and a speed command generator 39 need only detect the absolute value of a moving speed of the light beam, the moving direction can be ignored.

FIG. 29 is a block diagram showing another embodiment of the present invention.

In this embodiment, a third compensation controller 45 is added to the apparatus in the embodiment shown in FIG. 25, which can provide a function for performing position control of the actuator 5 in accordance with a light beam deviation amount.

In this embodiment, an excessive increase in light beam deviation amount can be prevented when driving force of the carriage 33 becomes insufficient.

If a control loop constituted by the third compensation controller 45 is not present, the carriage 33 would not be able to follow the actuator 5 when driving power of the carriage 33 is small. Therefore, the actuator 5 deviates with respect to the optical head up to its mechanical limit.

Since the actuator 5 excessively deviates with respect to the optical head (i.e., the light beam deviation amount is too large), the optical axis of a parallel light beam shifts greatly. As a result, information (e.g., the tracking error signal) cannot easily be obtained. Therefore, the deviation amount of the actuator 5 with respect to the optical head must be limited in accordance with the light beam deviation amount.

Figure 30:
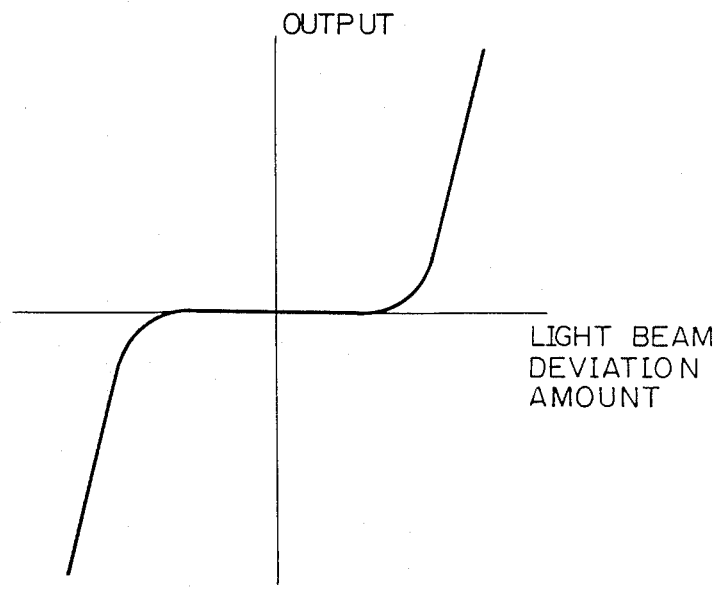
FIG. 30 is a graph showing an output from a third compensation controller in the embodiment shown in FIG. 29 as a function of a light beam deviation amount.

To do this, the third compensation controller 45 is used to generate an output shown in FIG. 30 in accordance with the light beam deviation amount, and the output therefrom is applied to the first compensation controller 42 through the adder 46, thereby performing position control of the actuator 5.

According to the present invention as described above, the actuator 5 and the carriage 33 are controlled, so that the light beam is moved based on a desired speed pattern with respect to a target track position, thus allowing high-speed access. When the tracks are traced other than in the access mode, the light beam deviation amount can be reduced by controlling the carriage 33 in accordance therewith, and a shift in optical axis can be suppressed.

Furthermore, in the access mode, the arrangement of the control loop need not be modified greatly. More specifically, cumbersome operations (for example, a complete open loop is constituted by interrupting tracking control, an actuator is controlled so as to follow the optical head in accordance with the light beam amount) need not be performed.

Since the carriage 33 is not moved based on the access distance, it need not be determined if the light beam is deviated by moving only the actuator 5 or by moving both the actuator 5 and the carriage 33. Therefore, not the access distance of the carriage but a speed of the light beam relative to a target track position need only be input as a target value so as to perform track access control.

A light beam access method according to another embodiment will now be described.

Figure 31:
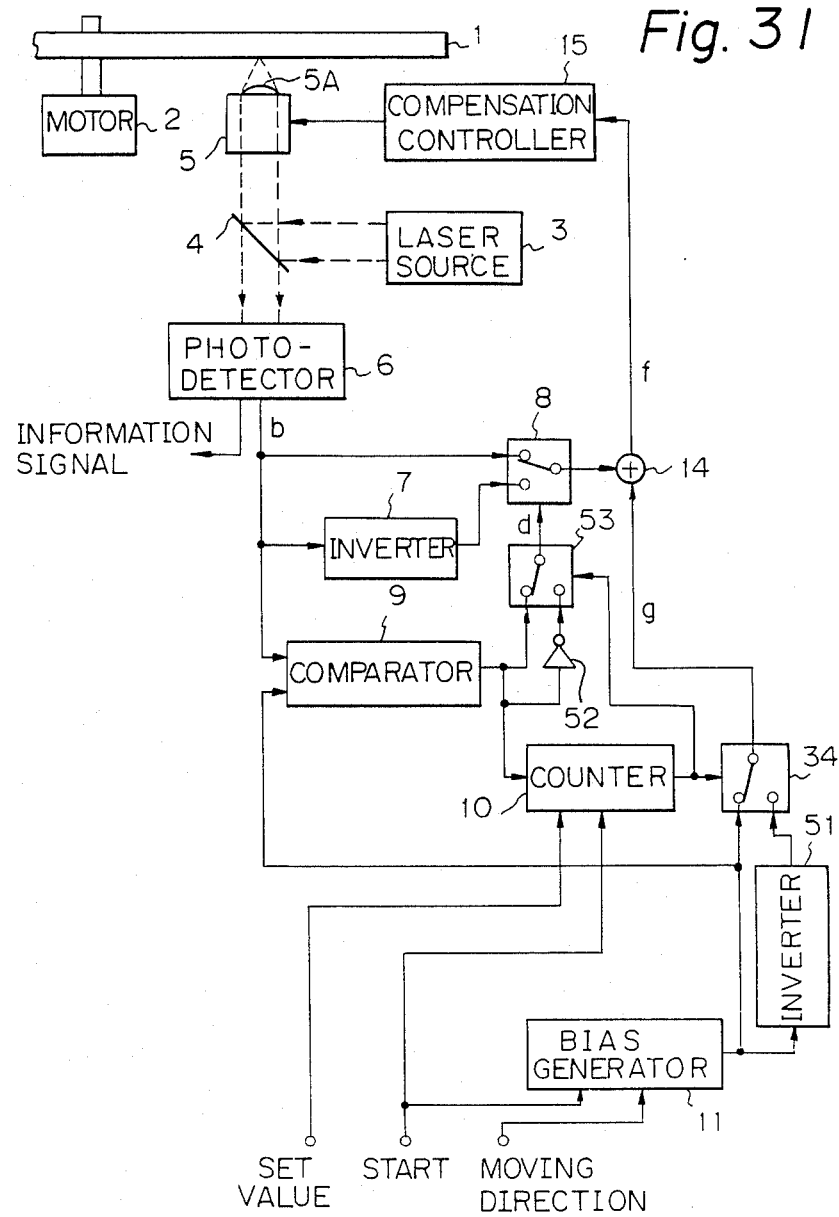
FIG. 31 is a block diagram showing another embodiment of the present invention.

FIG. 31 is a block diagram showing another embodiment of the present invention. The same reference numerals in FIG. 31 denote the same parts as in FIG. 1.

An inverter 51 inverts an output signal from a bias generator 11. A switch 34 switches the output signals from the bias generator 11 and the inverter 51. An inverter 52 inverts a binary signal from a comparator 9. A switch 53 switches the outputs from the comparator 9 and the inverter 52, and generates the binary signal for controlling a switch 8. Note that the switches 53 and 34 are controlled by a signal from a counter 10.

Figure 32:
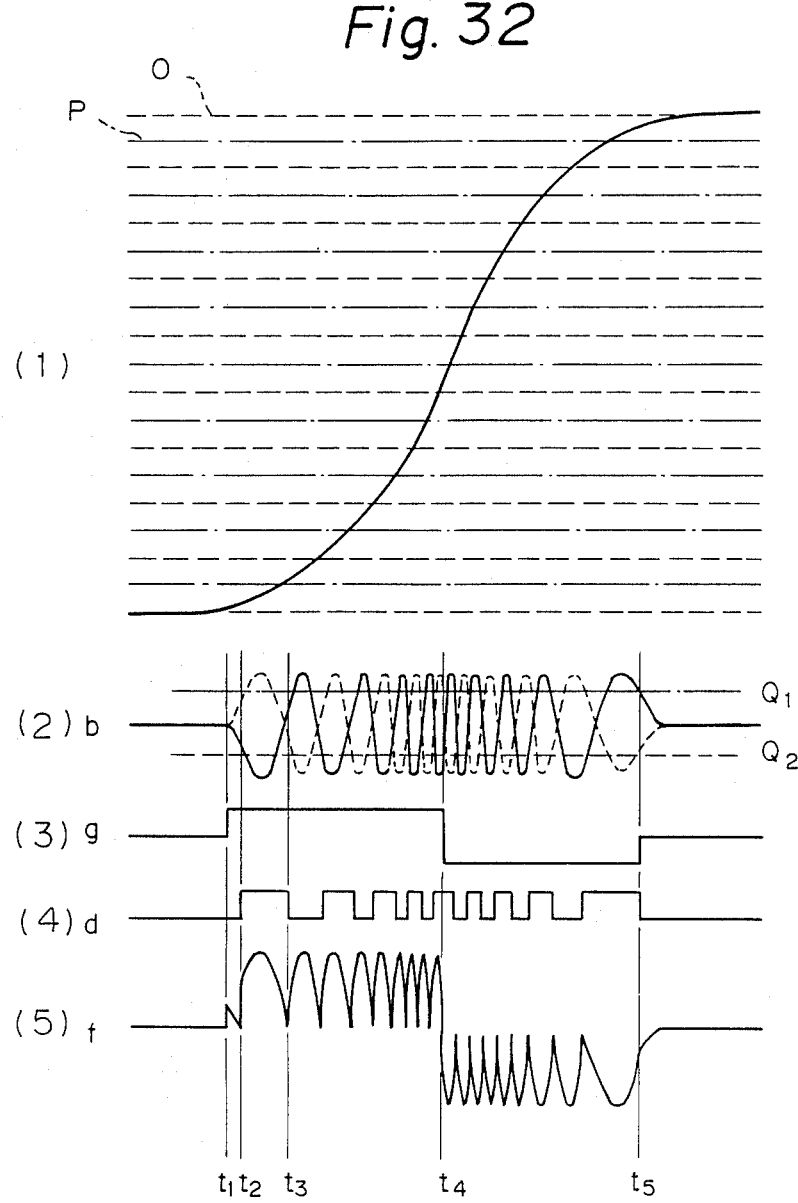
FIGS. 32(1) to 32(5) are timing charts when the light beam crosses tracks upon speed control.

FIG. 32(1) illustrates a state in which a light beam spot crosses tracks. FIG. 32(2) shows a tracking error signal b generated from a photodetector 6, FIG. 32(3) shows a signal g input to an adder 14, FIG. 32(4) shows a control signal d generated from the switch 53 for controlling the switch 8, and FIG. 32(5) shows a signal f supplied from the adder 14 to the compensation controller 15.

In FIG. 32, since the descriptions for the timings $t_1$ to $t_3$ are the same as those in FIG. 2, they will be omitted.

The counter 10 counts one of two levels of the binary signal from the comparator 9 (which corresponds to the number of times the light beam spot passes by tracks) or transitions of the binary signal therefrom. When the count reaches half the preset count value input from an external circuit, the counter 10 generates a switching signal for the switches 53 and 34 (time $t_4$). Thereby, the switch 34 generates the output signal from the inverter 51, as shown in FIG. 32(3), and the switch 53 generates the output signal 52 from the inverter 52, as shown in FIG. 32(4).

Therefore, after time $t_4$, the switching control operation of the switch 8 is reversed to that before time $t_4$. In this way, the output signal from the adder 14 before time $t_4$ is quite different from that thereafter, as shown in FIG. 32(5) (i.e., before time $t_4$, a positive output signal is generated, but thereafter, a negative output signal is generated). As a result, a brake signal is supplied to a light beam actuator 5 after time $t_4$, thus decreasing the moving speed of the light beam spot. Therefore, after the count operation of the counter 10 ends (time $t_5$), the light beam spot can accurately access a target track position under normal tarcking control.

In the above embodiment, the switching signal for the switches 53 and 54 is generated when the count from the counter 10 has reached half the preset value. However, the present invention is not limited to this. For example, the switching signal can be generated at desired timing before the light beam spot is reached a target track position.

Figure 33:
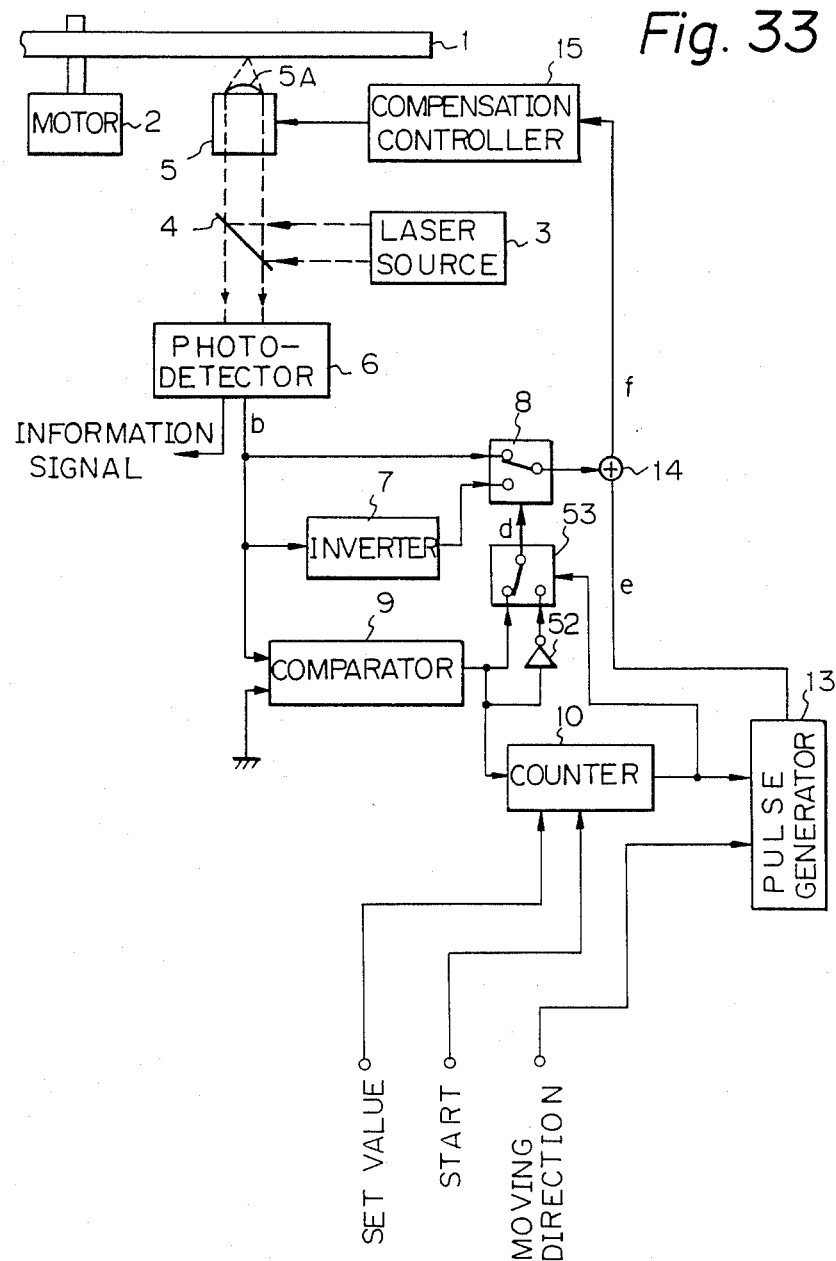
FIG. 33 is a block diagram showing another embodiment of the present invention.

FIG. 33 is a block diagram showing another embodiment of the present invention. In this embodiment, the same reference numeral in FIG. 33 denote the same parts as in FIG. 31.

Figure 34:
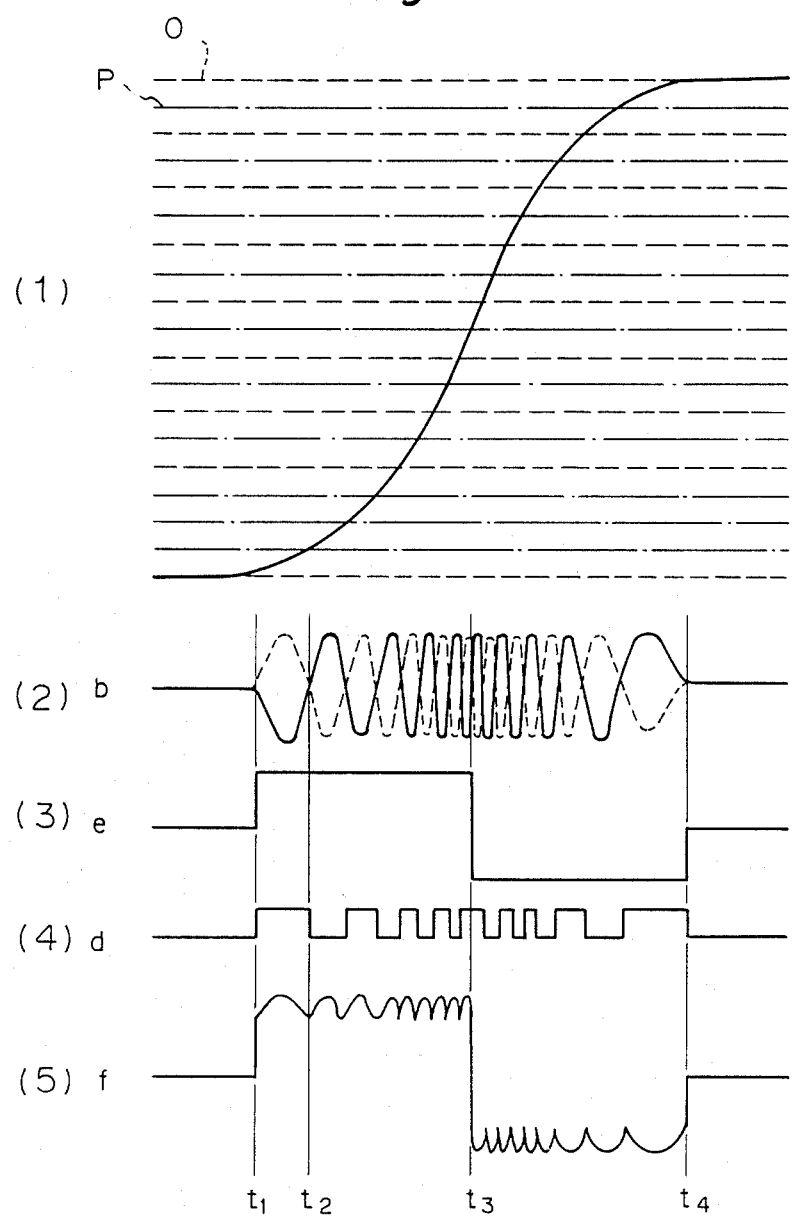
FIGS. 34(1) to 34(5) are illustrations when the light beam crosses tracks upon speed control.

FIG. 34(1) illustrates when the light beam spot crosses tracks. FIG. 34(2) shows a tracking error signal b generated from a photodetector 6, FIG. 34(3) shows a signal g input to an adder 14 from a pulse generator 13, FIG. 34(4) shows a control signal d generated from the switch 53 for controlling the switch 8, and FIG. 34(5) shows a signal f supplied from the adder 14 to the compensation controller 15.

When a moving direction signal, a count start signal, and a count set value signal are supplied from an external device at time $t_1$, the counter 10 supplies a start signal to a pulse generator 13, which generates a positive or negative constant voltage (in FIG. 34(3), a positive constant voltage) in accordance with the moving direction signal. The pulse voltage from the generator 13 is added to the tracking error signal by the adder 14, and the sum voltage is supplied to the compensation controller 15. Thus, the actuator 5 receives a signal for moving the light beam spot slight in a predetermined direction from the central portion of a track, and the beam spot starts moving immediately.

At the same time, the binary output signal from the comparator 9 changes, thus switching the switch 8, which supplies the inverted tracking error signal (indicated by a broken line in FIG. 34(2)), i.e., the output signal from the inverter 7 to the adder 14.

When the tracking error signal reaches 0 level at time $t_2$, the binary output signal from the comparator 9 changes, thus switching the switch 8. Thus, the switch 8 supplies the tracking error signal directly to the adder 14.

After time $t_2$, the switch 8 is similarly switched based on the binary output signal from the comparator 9.

On the other hand, the counter 10 counts one of the two levels of the binary output signal from the comparator 9 (corresponding to twice the number of times the light beam spot has passed by tracks). When the count reaches half the preset count value input externally, the counter 10 generates a switching signal for the switch 53 and the pulse generator 13 (time $t_3$) Thus, the pulse generator 13 generates the inverted output signal (a negative constant voltage), as shown in FIG. 34(3), and the switch 53 generates the output signal from the inverter 52.

Therefore, after time $t_3$, the switching control operation of the switch 8 is reversed to that therebefore. In this way, the output signal from the adder 14 after time $t_3$ is quite different from that thereafter, as shown in FIG. 34(5) (i.e., a positive output signal is generated before time $t_3$, but a negative output signal thereafter). Although an acceleration signal is supplied to the actuator 5 before time $t_3$, a brake signal is supplied thereto after time $t_3$, thus decreasing the moving speed of the light beam spot. Therefore, after the count operation of the counter 10 ends (time $t_4$), the light beam spot can access a target track position under normal tracking control.

. In order to clearly distinguish a normal tracking loop from an access loop, the control signal from the switch 8 is preferably gated by the count from the counter 10, thus improving reliability.

The present invention is not limited to the above embodiments, and various other changes and modifications may be made within the spirit and scope of the invention recited in the appended claims.

What is claimed is:

1. A tracking control apparatus comprising:
   irradiating means for irradiating a track arranged on a recording medium with a light beam;
   error detecting means for detecting an error between a position of said track and a position of said light beam and for outputting an error signal;
   inverting means for inverting a polarity of said error signal from said error detecting means;
   moving means for moving an irradiating position of said light beam;
   driving means for outputting a driving signal for driving said moving means, in response to a synthesized signal produced by synthesizing said error signal and an inverted signal of said error signal means for producing the synthesized signal; and
   braking means for outputting to said driving means a braking signal with a polarity opposite to a polarity of said driving signal, in order to apply a braking force to said light beam moved by said moving means;
   wherein said driving means includes synthesizing means for synthesizing said driving signal and said braking signal.

2. An apparatus according to claim 1, further comprising means for detecting a moving speed of the light beam relative to the track, and wherein said braking means changes the braking signal in accordance with the relative speed.

3. An apparatus according to claim 1, wherein said braking means increases a light beam moving control gain in said moving means after the light beam has reached a target track position.

4. An apparatus according to claim 1, wherein said driving means includes selecting means for alternately selecting one of said error signal and said inverted signal with a predetermined timing in order to generate said driving signal.

5. An apparatus according to claim 1, wherein said braking means outputs the braking signal to the driving means when said light beam reaches or comes close to a target track position.

6. An apparatus according to claim 1, wherein said moving means allows said light beam to be moved in the direction perpendicular to said track.

7. A tracking control apparatus comprising:
   irradiating means for irradiating a track arranged on a recording medium with a light beam;
   error detecting means for detecting an error between a position of said track and a position of said light beam and for outputting an error signal;
   inverting means for inverting a polarity of said error signal from said error detecting means;
   moving means for moving an irradiating position of said light beam;
   driving means for outputting a driving signal for driving said moving means, in response to a synthesized signal produced by synthesizing said error signal and an inverted signal of said error signal;
   means for producing the synthesized signal;
   means for detecting a moving speed of the light beam; and
   means for controlling the moving speed of the light beam by controlling said driving signal in accordance with an output from said speed detection means.

8. An apparatus according to claim 7, wherein said control means controls an inversion timing of said inverting means.

9. An apparatus according to claim 7, wherein said speed detection means detects the speed of the light beam on the basis of the error signal from said error detecting means.

10. An apparatus according to claim 7, wherein said driving means includes selecting means for alternately selecting one of said error signal and said inverted signal with a predetermined timing in order to generate said driving signal.

11. An apparatus according to claim 7, wherein said moving means allows said light beam to be moved in a direction perpendicular to said track.

12. A tracking control apparatus comprising:
   irradiating means for irradiating a track arranged on a recording medium with a light beam;
   error detecting means for detecting an error between a position of said track and a position of said light beam and for outputting an error signal;
   inverting means for inverting a polarity of said error signal from said error detecting means;
   first moving means for moving an irradiating position of said light beam;
   driving means for outputting driving signal for driving said first moving means, in response to a synthesized signal produced by synthesizing said error signal and an inverted signal of said signal; means for producing the synthesized signal;

second moving means for moving said first moving means with said irradiating means;

detecting means for detecting a movement amount of said light beam moved by said first moving means; and control means for activating said second moving means in response to said movement amount detected by said detecting means.

13. An apparatus according to claim 12, wherein said first moving means allows said light beam to be moved in the direction perpendicular to said track.

14. An apparatus according to claim 12, wherein said driving means includes selecting means for alternately selecting one of said error signal and said inverted signal with a predetermined timing in order to generate said driving signal.

* * * * *